United States Patent
Jin et al.

(10) Patent No.: US 10,539,950 B2
(45) Date of Patent: *Jan. 21, 2020

(54) FABRICATING FULL COLOR THREE-DIMENSIONAL OBJECTS

(71) Applicant: Microsoft Technology Licensing, LLC, Redmond, WA (US)

(72) Inventors: Yulin Jin, Redmond, WA (US); Emmett Lalish, Seattle, WA (US); Kris N. Iverson, Redmond, WA (US); Jesse McGatha, Sammamish, WA (US); Shanen J. Boettcher, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 88 days.

This patent is subject to a terminal disclaimer.

(21) Appl. No.: 15/229,230

(22) Filed: Aug. 5, 2016

(65) Prior Publication Data

US 2016/0342150 A1    Nov. 24, 2016

Related U.S. Application Data

(63) Continuation of application No. 14/203,140, filed on Mar. 10, 2014, now Pat. No. 9,434,108.

(51) Int. Cl.
*G05B 19/4099* (2006.01)
*G05B 15/02* (2006.01)
(Continued)

(52) U.S. Cl.
CPC ......... *G05B 19/4099* (2013.01); *B33Y 10/00* (2014.12); *B33Y 50/02* (2014.12);
(Continued)

(58) Field of Classification Search
CPC .... G05B 19/4099; G05B 15/02; B33Y 50/02; B33Y 10/00
See application file for complete search history.

(56) References Cited

U.S. PATENT DOCUMENTS

| 6,780,368 B2 | 8/2004 | Liu et al. |
| 2002/0062909 A1 | 5/2002 | Jang et al. |

(Continued)

FOREIGN PATENT DOCUMENTS

| CN | 103068588 A | 4/2013 |
| JP | 2000280357 A | 10/2000 |

OTHER PUBLICATIONS

"First Office Action and Search Report Issued in Chinese Patent Application No. 201580013556.7", dated Apr. 28, 2017, 5 Pages. (W/o English Translation).

(Continued)

*Primary Examiner* — Mohammad Ali
*Assistant Examiner* — Vincent W Chang
(74) *Attorney, Agent, or Firm* — International IP Law Group, PLLC

(57) ABSTRACT

A method, computing system, and one or more computer-readable storage media for fabricating full color three-dimensional objects are provided herein. The method includes transforming a three-dimensional model into instructions for a fabrication device by slicing the three-dimensional model into layers with color information preserved, generating two-dimensional polygons for each layer based on colors on faces, colors on textures, and/or gradient colors, and determining a tool path for fabricating an object from colored materials based on the two-dimensional polygons for each layer. Determining the tool path includes generating instructions that direct the fabrication device to apply colored material for all two-dimensional polygons of a same color before switching colors, smooth an exterior of (Continued)

the object by switching colors at an internal vertex of each two-dimensional polygon within each layer, and deposit transitional material within an infill area, a support structure, and/or an area outside the object when switching colors.

21 Claims, 20 Drawing Sheets

(51) Int. Cl.
    *B33Y 50/02* (2015.01)
    *B33Y 10/00* (2015.01)

(52) U.S. Cl.
    CPC ...... *G05B 15/02* (2013.01); *B29K 2995/0021* (2013.01); *G05B 2219/49008* (2013.01); *G05B 2219/49013* (2013.01); *G05B 2219/49018* (2013.01); *G05B 2219/49019* (2013.01); *G05B 2219/49023* (2013.01)

(56) References Cited

U.S. PATENT DOCUMENTS

| | | | |
|---|---|---|---|
| 2002/0167101 A1 | 11/2002 | Tochimoto et al. | |
| 2003/0164567 A1* | 9/2003 | Coe | B29C 67/0059 264/40.1 |
| 2012/0255663 A1 | 10/2012 | Holroyd et al. | |
| 2013/0095302 A1 | 4/2013 | Pettis et al. | |
| 2013/0287933 A1 | 10/2013 | Kaiser et al. | |
| 2014/0034214 A1 | 2/2014 | Boyer et al. | |
| 2014/0070461 A1* | 3/2014 | Pax | B29C 67/0055 264/401 |
| 2014/0277661 A1 | 9/2014 | Arnadio et al. | |
| 2015/0246488 A1 | 9/2015 | Boettcher et al. | |

OTHER PUBLICATIONS

Amadio, et al., U.S. Appl. No. 13/910,958, "Full Color Three-Dimensional Object Fabrication", filed Jun. 5, 2013, pp. 1-42.
Davidson et al., "File2Part: Software that Makes 3D Printing Easy", Published on: Aug. 24, 2012, Available at: hftp://www.kickstarter.com/projects/878533101/file2part-software-that-makes-3d-printing-easy, pp. 1-4, Needham, MA, USA.
General Fabb, "More ProDesk3D Details Revealed", Published on: Sep. 17, 2013, Available at: http://fabbaloo.com/blog/2013/9/17/more-prodesk3d-details-revealed.html, pp. 1-4.
Z Corporation, "Z Corporation 3D Printing Technology", Published on: Oct. 26, 2007, Available at: http://www.zcorp.com/documents/108_3D%20Printing%20White%20Paper%20FINAL.pdf, pp. 1-7.
Zhang, et al., "Contour Crafting Process Planning and Optimization", In 26th International Symposium on Automation and Robotics in Construction, May 14, 2009, pp. 576-583.
"International Search Report & Written Opinion Issued in PCT Application No. PCT/US2015/017888", dated Sep. 7, 2015, 11 Pages.

* cited by examiner

604

704

= Pink

= Purple

= Blue

= Green

800

1000

1100

1300

FABRICATING FULL COLOR THREE-DIMENSIONAL OBJECTS

CROSS-REFERENCE TO RELATED APPLICATIONS

This application is a continuation of U.S. patent application Ser. No. 14/203,140, filed Mar. 10, 2014, and entitled "FABRICATING FULL COLOR THREE-DIMENSIONAL OBJECTS", the application of which is incorporated herein in its entirety by reference.

BACKGROUND

There are a number of processes for creating a digital model and producing a three-dimensional solid object of virtually any shape from that model. These processes may be referred to as three-dimensional printing, rapid prototyping, fused-filament, additive manufacturing, or the like. One technology involves curing ultraviolet (UV) sensitive resin with an ultraviolet (UV) light, which may be either a laser or a projection. To print an object, that object is primed with a layer of resin, either by lowering the object into a vat such that a minute layer remains above the object or by dipping the object into a vat until just short of the bottom. The UV light cures the resin into the desired shape for that layer. However, this technology may limit the number of resins that can be fabricated.

Another technology that adds material, such as a thermoplastic filament, in layers involves extruding the thermoplastic filament through an extruder (or hot end) tool head, which is heated to melt plastic filament such that the melted filament can be moved in three dimensions, but typically only in horizontal and vertical directions, to fill successive geometries, building each layer, one atop the next. The material hardens almost immediately after extrusion from the nozzle.

These technologies typically have single or dual-color capabilities, but lack the capability, in terms of, for example, mechanical components, to represent a full gamut of colors in a color space. In addition, none of the conventional technologies are capable of determining exactly which color to produce because they are not capable of translating a full-color model into machine instructions that generate the full color gamut on the device. Limitations imposed by such conventional technologies, including but not restricted to those mentioned above, inhibit full color three-dimensional object fabrication.

SUMMARY

The following presents a simplified summary of the subject innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

An embodiment provides a method for fabricating full color three-dimensional objects. The method includes transforming a three-dimensional model into instructions for a fabrication device by slicing the three-dimensional model into layers with color information preserved, generating two-dimensional polygons for each layer based on colors on faces, colors on textures, and/or gradient colors, and determining a tool path for fabricating a full color three-dimensional object from colored materials based on the two-dimensional polygons for each layer. Determining the tool path includes generating instructions that direct the fabrication device to apply colored material for all two-dimensional polygons of a same color before switching colors, smooth an exterior of the full color three-dimensional object by switching colors at an internal vertex of each two-dimensional polygon within each layer, and deposit transitional material within an infill area, a support structure, and/or an area outside the full color three-dimensional object when switching colors.

Another embodiment provides a computing system for fabricating full color three-dimensional objects. The computing system includes a fabrication device and a fabrication manager communicably coupled to the fabrication device. The fabrication manager includes a processor that is configured to execute stored instructions and a system memory. The system memory includes code configured to slice a three-dimensional model into layers with color information preserved and generate two-dimensional polygons for each layer based on colors on faces, colors on textures, and/or gradient colors, wherein each two-dimensional polygon includes a single color. The system memory also includes code configured to determine a tool path for fabricating a full color three-dimensional object from colored materials based on the two-dimensional polygons for each layer. Determining the tool path includes generating instructions that direct the fabrication device to apply colored material for all two-dimensional polygons of a same color before switching colors, switch colors at an internal vertex of each two-dimensional polygon within each layer, and deposit transitional material within an infill area, a support structure, and/or an area outside the full color three-dimensional object when switching colors. The fabrication device is configured to fabricate the full color three-dimensional object based on the instructions.

In addition, another embodiment provides one or more computer-readable storage media for storing computer-readable instructions. The computer-readable instructions provide a system for fabricating a three-dimensional object when executed by one or more processing devices. The computer-readable instructions include code configured to slice a three-dimensional model into layers with material information preserved and generate two-dimensional polygons for each layer. Each two-dimensional polygon includes a single type of material. The computer-readable instructions also include code configured to determine a tool path for fabricating the three-dimensional object from different types of materials based on the two-dimensional polygons for each layer. Determining the tool path includes generating instructions that direct a fabrication device to apply material for all two-dimensional polygons of a same material before switching materials, switch materials at an internal vertex of each two-dimensional polygon within each layer, and deposit transitional material within an infill area, a support structure, and/or an area outside the three-dimensional object when switching materials.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
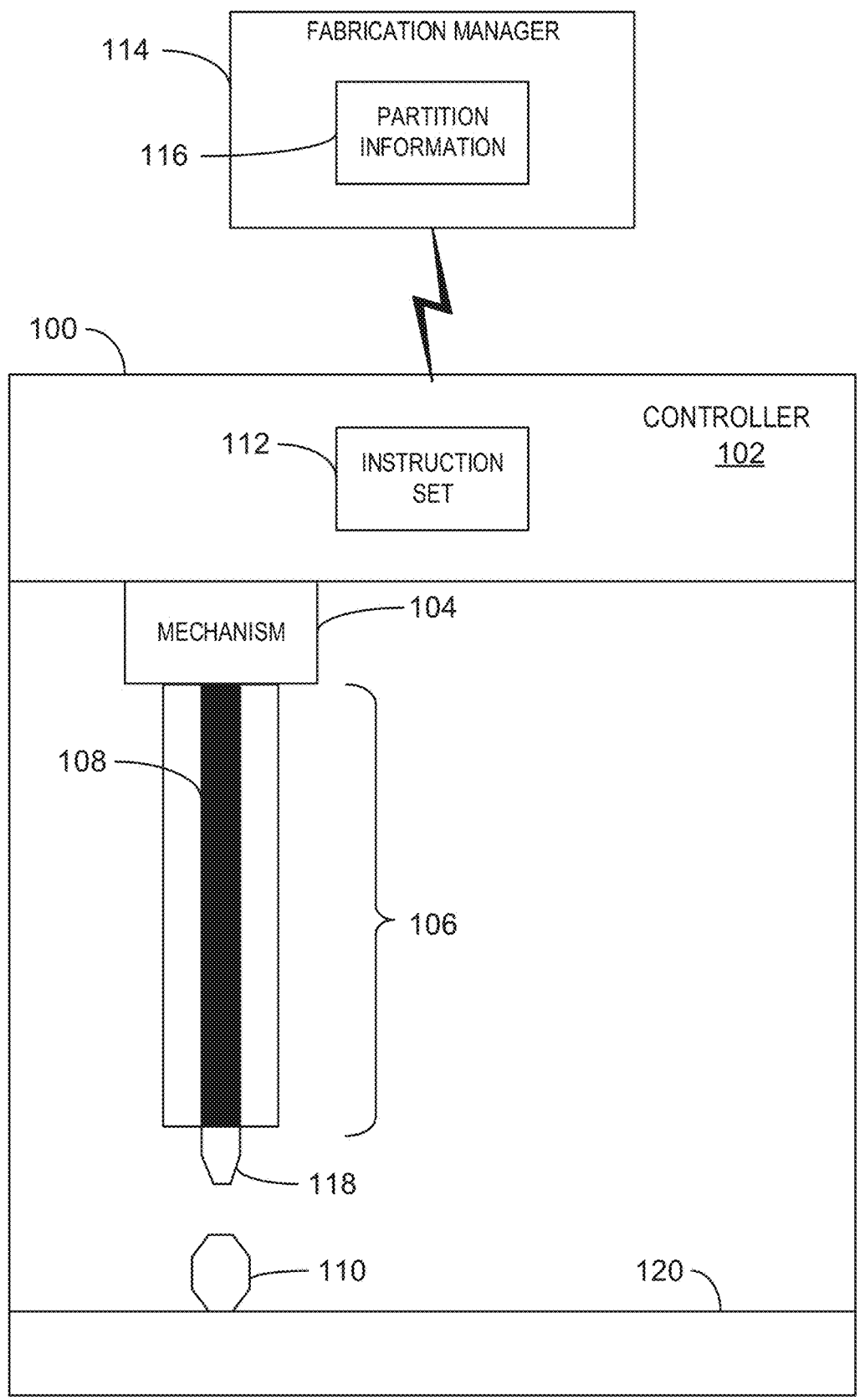
FIG. 1 is a block diagram of a fabrication device for transforming a three-dimensional model into instructions for mixing colored materials according to one or more example implementations.

Embodiments described herein are generally directed towards a fabrication manager configured to generate an instruction set, which when executed, causes a fabrication device to fabricate a full color three-dimensional object using multiple colored materials. More specifically, the instruction set describes the exact tool path the tool head of the fabrication device will follow to create the full color three-dimensional object, as well as the appropriate time to switch colors and the amount of material to be deposited at each point in time. The tool head may include a head with a nozzle and a set of motors, which can be local or remote. Moreover, in some embodiments, the tool head may include multiple heads, each with its own nozzle. In various embodiments, the fabrication manager generates the instruction set such that smoothing on the exterior of the object is optimized and material usage is minimized when switching colors. Further, the fabrication manager may generate the instruction set by slicing a full color three-dimensional model into layers and providing specific instructions for each layer, as described further below.

In various embodiments, to represent the object's geometry, the fabrication manager partitions the object's three-dimensional model (e.g., a mesh model) into layers, decomposes each layer into geometric elements (e.g., two-dimensional polygons), and projects each element onto the layer's plane forming the object's shell. The two-dimensional polygons describe colors on faces, colors on textures, and/or gradients colors within the three-dimensional model. After determining an approximate minimum or smallest amount of colored material capable of being deposited at a given instance, the fabrication manger uses that amount to define addressable units on the object's shell such that each unit represents a color for a specific geometric element or a portion thereof. These units enable color changes to be identified, providing seamless transitioning between multiple colors during fabrication. These units also allow the fabrication device to extrude different volumes of materials at any given instance. Color resolution also may increase or decrease depending on unit size. This technique may be applied to the object's entire volume, including the outer shell, particularly, if translucent materials are in use such that interior portions of the object will be externally visible through the transparent or translucent shell.

It is noted that object construction is not restricted to operating in a two-dimensional plane. This is merely a simplification for the slicer. Embodiments may apply these techniques in three dimensions on the surface of an object it simultaneously builds.

One example implementation represents the addressable units as voxelized data (e.g., voxelized data structure). According to one example implementation, given the fabrication device's three-dimensional space factored by a minimum volume of extrudable material, the fabrication manager defines a resulting volume as a voxel unit (e.g., a volumetric pixel). Each voxel unit generally includes a variety of information corresponding to the object's geometry in that unit's volume. Examples of such information include a three-dimensional mesh model, material information, color information, lighting information and/or texture information (e.g., a texture pattern). The lighting information may include luminosity values, reflection/refraction ratios and/or the like. The fabrication manager may use the lighting information to adjust values in the color information in order to simulate lighting effects. Other information may include implicit surface values (e.g., distance to an object surface mesh). Yet another example of such information includes probabilities indicating whether or not a portion of the object actually occupies the volume represented by the voxel unit.

The fabrication manager may use the texture information to compute a color value for each voxel unit. As the fabrication manager identifies a tool path for printing the three-dimensional object, the fabrication manager also may identify colors that are to be applied to interior locations within the object and/or an outside or exterior shell (e.g., surface mesh) of the object using the texture information. The fabrication manager may provide full color by applying colorized texture patterns to the exterior object shell and/or to each layer (e.g., if color inside the object is desired) via a process where a material is made fluid by heat and/or by chemical reaction and extruded through a nozzle. In one embodiment, the material may be resin. Alternatively, the fabrication manager computes color values for voxelized data without texture information by using explicit color declarations, gradients, interpolations, and other mathematical procedures.

The following describes example embodiments of a printing tool configured to blend colored material for extrusion during full color three-dimensional object fabrication. An example extruder configuration includes an arrangement of motors and a tool head having a mixing chamber and a nozzle. The example extruder configuration may also include a stir within the chamber, or any other suitable mechanism for mixing colors. The tool head also may include a heating element for melting the colored material to a prescribed temperature. The arrangement of motors cooperates to move a combination of colored materials into the mixing chamber and, when sufficiently heated and/or blended, through the tool head to be deposited on the object. Regarding the tool head, the mixing chamber and/or the nozzle are constructed to automatically blend colored materials without an additional mechanism. To illustrate, one example combination includes the colors cyan, yellow, black, and green, where green is not in input color but, instead, is a mixture of cyan and yellow. Hence, the extruder configuration may apply a first volume of cyan material, a second volume of yellow material, a third volume of black material, and a fourth volume of green material (by blending appropriate volumes of cyan and yellow materials). It is to be noted that the embodiments described herein are not limited to the aforementioned color combination but, rather, may include any number of other suitable colors, including, for example, white and transparent.

As a preliminary matter, some of the figures describe concepts in the context of one or more structural components, variously referred to as functionality, modules, features, elements, or the like. The various components shown in the figures can be implemented in any manner, such as via software, hardware, firmware, or any combinations thereof. In some embodiments, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like.

The term "logic" encompasses any functionality for performing a task. For instance, each operation illustrated in the flowcharts corresponds to logic for performing that operation. An operation can be performed using, for instance, software, hardware, firmware, or the like.

As used herein, the terms "component," "system," and the like are intended to refer to a computer-related entity, either hardware, software (e.g., in execution), or firmware, or any combination thereof. For example, a component can be a process running on a processor, an object, an executable, a program, a function, a subroutine, a computer, or a combination of software and hardware. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computing device to implement the disclosed subject matter. The term "article of manufacture" as used herein is intended to encompass a computer program accessible from any computer-readable storage device or media.

Computer-readable storage media can include, but are not limited to, magnetic storage devices (e.g., hard disk, floppy disk, and magnetic strips, among others), optical disks (e.g., compact disk (CD) and digital versatile disk (DVD), among others), smart cards, and flash memory devices (e.g., card, stick, and key drive, among others). In contrast, computer-readable media (i.e., not storage media) generally may additionally include communication media such as transmission media for wireless signals and the like.

FIG. 1 is a block diagram of a fabrication device 100 for transforming a three-dimensional model into instructions for mixing colored materials according to one example implementation. The fabrication device 100 may include a control unit or controller 102 coupled to a first mechanism 104 and configured to execute instructions for the first mechanism 104 and a second mechanism 106. A chamber 108 constructed within the second mechanism 106 allows colored materials to be prepared (e.g., heated) and/or blended when fabricating an object 110. For example, the chamber 108 enables melting, mixing, and extruding of colored filaments or a combination of compatible materials.

The instructions mentioned above, which are stored in an instruction set 112, may be collectively referred to as coordinated instructions because such instructions are executed, for the most part, harmoniously. According to various embodiments described herein, a fabrication manager 114 may coordinate the instructions in a number of implementations. For example, instructions for different stepper motors in an extruder configuration may be coordinated such that an appropriate colored material is fed into the chamber 108, enabling seamless color changes. Therefore, an instruction for one stepper motor may be synchronized in time with an instruction for another stepper motor such that both stepper motors can operate in parallel, in sequence or in any order that reduces waste, quickens fabrication time, and/or improves quality. The instructions may be further coordinated with instructions for moving the first mechanism 104 as described herein.

The fabrication manager 114 may include hardware and software components operating on various embodiments of computing devices, such as a remote computing device and/or an attached computing device. One example implementation of the fabrication manager 114 processes captured volumetric sensor data, corresponding to an object being fabricated, in a three-dimensional model and partitions that information into layers in which each layer includes at least some geometry, which may include geometric elements corresponding to a surface mesh. The present disclosure may use "partition", "slice", or another similar term in place of "layer" and it is appreciated that these terms be defined as interchangeable.

Within partition information 116, the fabrication manager 114 stores color values corresponding to a geometry of the three-dimensional model. Geometry generally refers to a set of geometric elements, such as a three-dimensional polygon or shape, which may represent an amount of colored material to be deposited. One example measure represents at least a portion of the geometry—and therefore, the amount of colored material—volumetrically. The example measure may define a portion of the geometry using standardized units in which each unit represents a minimal amount (e.g. volume) of colored material at a given time instance, such as by an extrusion width. Each geographic element may include one or more standardized units.

To illustrate one example, a valid manifold object, represented in a three-dimensional mesh model, may be partitioned into layers by processing each triangle representing the object, and projecting each triangle through a slicing plane. This projection generates a point and connections to other points in a manner that eventually creates an enclosed path. From this point, the path is reduced to units (e.g., volumetric measures of geometric elements) representing the smallest addressable unit for a specific hardware characteristic of a corresponding fabrication device. The units are not necessarily the same size, axis aligned, and/or the same size in each dimension. One example implementation may utilize non-cubic units of different sizes along an x, y, or z axis, which enables different effective resolutions per dimension. In some embodiments, one or more support structures may not be enclosed but, instead, may be ribbons of waffle-like supports that bend back on themselves repeatedly.

According to one example implementation, the partition information 116 may include voxelized data such that each addressable (voxel) unit includes a variety of information, such as a color value, texture value, and/or lighting value, for geometry within that addressable unit.

The first mechanism 104 may be referred to as a robotic mechanism (e.g., a gantry robot) including various mechanical or electro-mechanical components. By executing at least some instructions within the instruction set 112, the first mechanism 104 may actuate these components into performing at least some physical movement. When actuated, these components may move horizontally, vertically, diagonally, rotationally, and so forth. One example implementation of the first mechanism 104 moves a printing mechanism or tool across an x, y, or z-axis in order to deposit material at a specific position within the object 110 being fabricated. It is noted that Cartesian coordinates are referenced for convenience of explanation. Other coordinate systems may be used instead, such as a polar coordinate systems or the like.

The second mechanism 106 may be referred to as a printing mechanism that includes one or more printing tool heads. The material may be pushed or pulled into a printing extruder or hot end tool head, and the motors may be mounted further away in order to push the material through a thin guide tube into the chamber 108. Although the second mechanism 106 may resemble an extruder configuration (e.g., a single extruder head configuration), it is appreciated that the second mechanism 106 represents any compatible technology, including legacy printing tool heads. Furthermore, the second mechanism 106 may include printing tool heads configured to deposit other materials in addition to colored materials and/or transparent materials. As such, the second mechanism 106 may include a second chamber that provides another material (e.g., a polymer) when printing certain structures during fabrication, such as support structures, purge structures, and/or the like. Purge structures may refer to areas of the object's model where unusable colored material is deposited. As one example, leftover (or "transitional") material in the chamber 108 may be deposited in the purge structure. The purge structures may be added to the object's model by the fabrication manager 114.

The fabrication manager 114 is configured to generate instructions that, when executed by the controller 102, actuate components of the first mechanism 104, which may result in movement(s) of the second mechanism 106 following a surface geometry (e.g., an exterior shell) of the object 110. The fabrication manager 114 also generates other instructions that, when executed by the controller 102, cause the second mechanism 106 to mix colored materials in the chamber 108, for example, by controlling stepper motor activity in order to feed colored materials into the chamber 108 and extrude blended colored materials through a nozzle 118. The fabrication manager 114 may configure both groups of instructions to be executed in coordination with each other, thereby enabling smooth color gradients in the object 110 and/or effective blending in the chamber 108 and/or the nozzle 118.

Optionally, a movable platform, such as a platform 120, functions as a mechanism for printing the object 110. The first mechanism 104 may operate the platform 120 to guide the object 110 and the nozzle 118 to each other. The instruction set 112 may include instructions for automatically calibrating the platform 120 such that through a series of movements in an x, y, and/or z direction or in rotation across an x-y plane, the three-dimensional object 110 is moved to a correct position for the nozzle 118 to deposit material.

Some example embodiments of the fabrication device 100 include legacy devices that are retrofitted with at least some of the components described herein, including the controller 102, the fabrication manager 114, and/or a printing tool head, such as the second mechanism 106. As one option, the fabrication device 100 may include an additional microprocessor to manage the set of motors and to receive a signal from an original microprocessor when a command (e.g., a GCode Color Change command) is processed. In one example implementation, a legacy microcontroller continues to pass motor speed values to the controller 102 as if the legacy microcontroller were directly managing a motor. The controller 102 applies a color ratio based on these values as the printing tool head extrudes and otherwise mimics a standard print head. The legacy microcontroller and/or firmware may be modified to support an extra signal for color changes.

Figure 2:
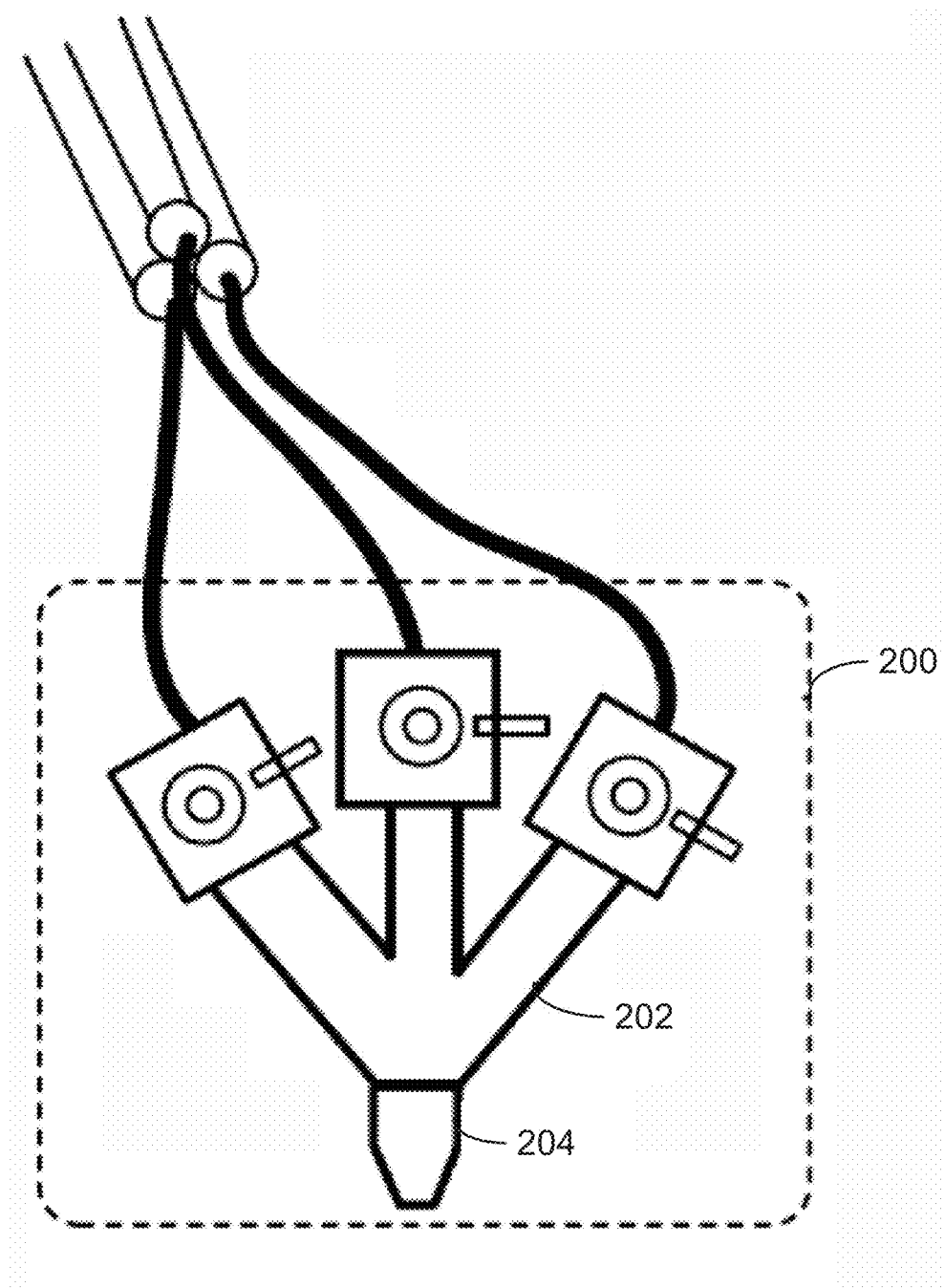
FIG. 2 is a schematic showing an exemplary extruder configuration for a fabrication device, such as the fabrication device described with respect to FIG. 1.

FIG. 2 is a schematic showing an exemplary extruder configuration 200 for a fabrication device, such as the fabrication device 100 described with respect to FIG. 1. In various embodiments, colored materials (e.g., three colored materials) are fed into the extruder configuration 200 from a source.

According to one example embodiment, the extruder configuration 200 includes stepper motors for at least three colored materials (e.g., filaments). This configuration may be extended to four, five, or six stepper motors for four, five, or six colored materials of various opacities, including an optional translucent material, for example. The extruder configuration 200 may also include a printing tool head including a chamber 202, which may be referred to as a mixing chamber or a melting chamber, and a nozzle 204. The printing tool head for the extruder configuration 200 may include a heating element and a thermostat to control melting and blending of colored materials within the chamber 202.

One example embodiment of the extruder configuration 200 operates by blending separate molten colored plastic filament material in a narrow melting chamber and extruding the mixture through a smaller bore within the printing tool head. The rate that the stepper motors move a colored material into the chamber 202 is based on a color value. The color value, possibly in combination with other properties (e.g., colored filament size, motor gear size, motor degree, and/or the like), may determine a speed of each stepper motor controlling the movement of each colored filament into the chamber 202. As material in the chamber 202 is pushed into the smaller diameter nozzle 204 (e.g., a rifled nozzle), the colored filament is further mixed into the desired color through resistance in the channel until it is finally deposited outside the nozzle 204 onto the object being printed.

Figure 3:
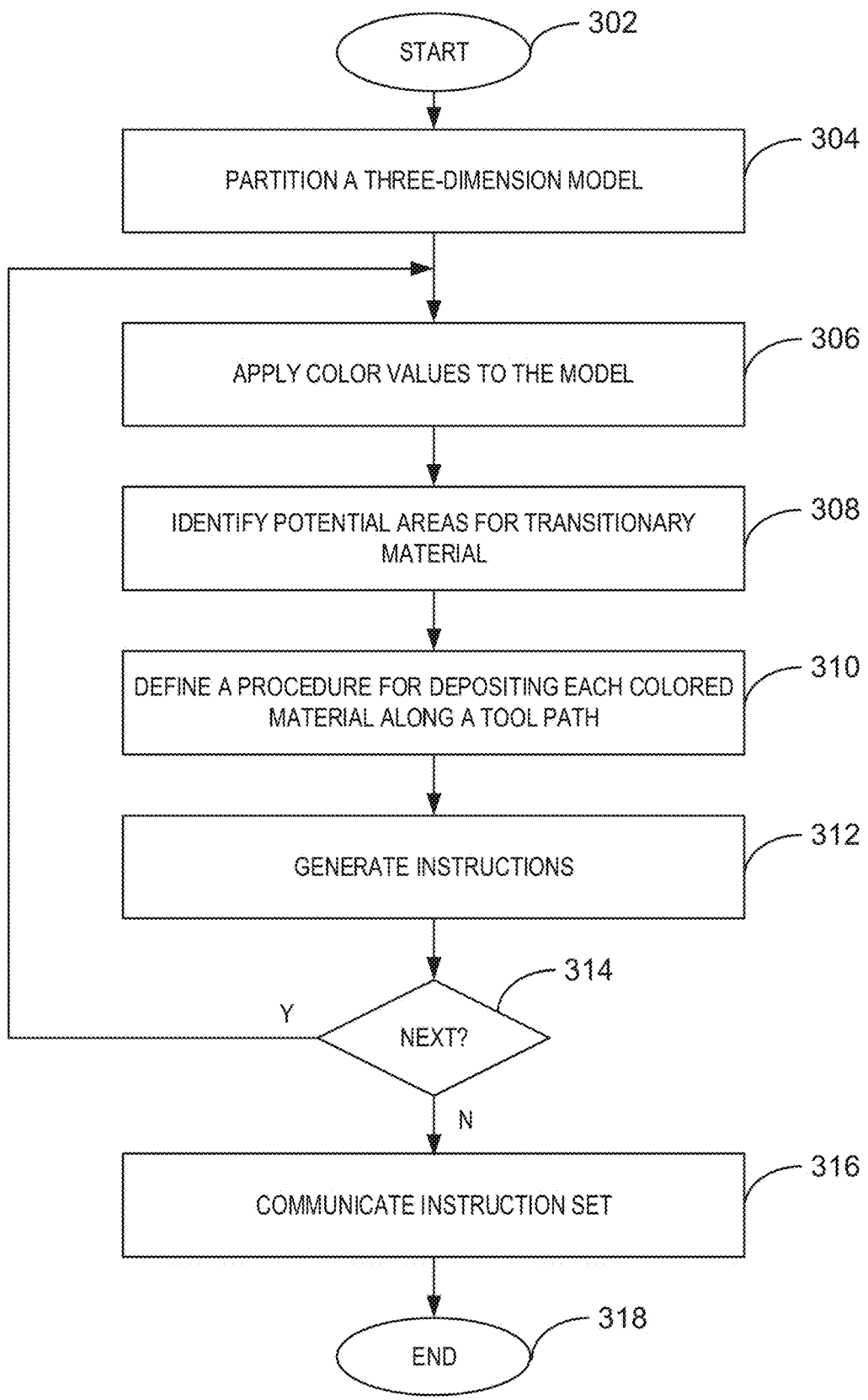
FIG. 3 is a process flow diagram of a method for generating a coordinated instruction set for a fabrication device.

FIG. 3 is a process flow diagram of a method 300 for generating a coordinated instruction set for a fabrication device. One or more hardware/software components (e.g., the fabrication manager 114 of FIG. 1) may be configured to perform the method 300. The method 300 commences at block 302 and proceeds to block 304, at which a three-dimensional model may be partitioned into layers. Each layer may be represented as a set of addressable units in which each unit includes at least a portion of a geometric element. Geometric elements generally refer to polygons projected onto a plane as paths having at least some volume. The paths may form an exterior shell representing an object being fabricated. The exterior shell may be enhanced into a solid representation, which may or may not have a colored interior geometry with a transparent exterior. In some embodiments, each unit is defined as a minimal amount/volume of colored material capable of being applied during fabrication. Hence, the path, or a portion thereof, in an example unit may have a volume equal to or less than the above minimal amount/volume of colored material. Other embodiments may define each unit in other ways, for example, as a voxel including one or more geometric elements.

In various embodiments, the three-dimensional model is partitioned along a Z-axis into Z layers. Each Z layer represents units in an X-Y plane that are to be filled with at least one colored material. Each layer may include a three-dimensional data structure based on the units included therein. The height of the Z layer is dependent on the resolution or quality of the fabrication device.

At block 306, color values may be applied to the model. One example implementation applies texture information to the units by mapping a texture pattern to the layer such that each unit's address is mapped to a coordinate in that texture pattern and translating each mapping into an appropriate color. Other example implementations utilize non-texture information to compute the color values (e.g., mathematical formulas deriving color value from position within the object). Some implementations may simplify the colors of complex textures (e.g., photographs) by averaging colors over particular ranges, in order to maximize blocks of a single color (to a certain tolerance), using well-known or custom interpolation algorithms (e.g., bicubic interpolation, bilinear interpolation, nearest neighbor, and the like).

On occasion, leftover (or "transitional") material may have to be purged before a next material of a different color physical characteristic can be prepared and deposited. Thus, at block 308, potential areas of the layer for depositing transitional materials may be identified. The identified areas may be defined as one or more units where color provides little or no value (e.g., aesthetic value). For example, models utilize exterior support structures to hold up overhanging parts of the object being fabricated. Support structures are intended to be broken or cut off at the end of the fabrication. This is one example area to deposit transitional material when a color change is expected. Another example includes interior fill regions that will be invisibly enclosed within the object once the fabrication is complete.

If there is not enough interior fill, or exterior support areas, to dump transitional colors, a waste object can be created alongside the main object being built. This may occur on higher layers (along the Z axis). As such, finding a suitable location may involve printing the waste object and injecting polygons down to the platform on each subsequently lower layer. At each of these generated color transition structure polygons, color may be re-calculated to prevent such waste in continued fabrication of the object. The size of the support structure might be bigger on yet higher layers. Accordingly, inserting the color transition structure maybe delayed until all layers have been processed initially. During this time, the number of color transition structures may be counted at each layer, enabling the pre-determination of color transition structure shapes and positions. To handle instances when a sudden color change is expected and transitional material remains in the fabrication device, but a convenient infill area for depositing such material is not available, one example implementation adds an extraneous structure to the three-dimensional model outside the dimensions of the object's geometry. This enables the fabrication device to purge the head until material for a next color is available. Another example is a dump area of the device hardware that allows for minimizing loss of material in generating purge structures all the way up to the layer where the dump occurs.

At block 310, a procedure may be defined for depositing a combination of colored materials along a tool path, such as performed to generate a smooth gradient. The procedure may involve moving a printing tool according to a tool path and controlling rates for applying each colored material along the tool path. One example implementation determines for each unit a stepper motor speed at which one or more colored materials are fed into the printing tool while that tool, following the tool path, moves the printing tool head to that unit's address/location on the object being fabricated. At block 312, instructions may be generated for the fabrication device, including a coordinated instruction set for the depositing procedure and the tool path.

One example implementation generates example coordinated instructions (e.g., op codes, g-code and/or the like) to drive a robotic mechanism (e.g., the first mechanism 104 of FIG. 1) and deposit colored materials using the printing tool (e.g., the second mechanism 106 of FIG. 1). The printing tool includes a head with a nozzle and a set of motors, which can be local or remote. A controller configures a tool-set or coordinated instruction set for each Z layer that, when executed, causes the robotic mechanism to move the printing tool head to an area where the printing mechanism deposits a combination of colored materials. Such a combination generally refers to a series of colored materials of which some may be blended to produce different colors and some colored materials may be individually applied. To illustrate, one example combination includes the colors cyan, yellow, black and green, where green is not an input color but, instead, is a mixture of cyan and yellow. Hence, the printing mechanism may apply a first volume of cyan material, a second volume of yellow material, a third volume of black material, and a fourth volume of green material (by blending volumes of cyan and yellow materials at an appropriate ratio).

Because at least some colored material remains in the printing mechanism, color changes may involve feeding a new colored material while applying a current colored material. The new colored material may be fed at a specific rate (e.g., a positive or negative rate), which is adjusted as more new colored material is moved by the printing mechanism. For example, if the current color is yellow and the printing mechanism is instructed to deposit green as the new color, the coordinated instructions cause the printing mechanism to slightly retract the yellow material and push in a slightly larger amount of the cyan material to blend with the existing yellow material.

After allowing the deposited material to cool or dry, it may be determined whether to fabricate a next layer of the three-dimensional model at block 314. If there are more layers in the model, the method 300 returns to block 306. Otherwise, the method 300 proceeds to block 316, at which the coordinated instruction set may be communicated to the fabrication device. The method 300 then ends at block 318.

The process flow diagram of FIG. 3 is not intended to indicate that the blocks 302-318 of the method 300 are to be executed in any particular order, or that all of the blocks 302-318 are to be included in every case. Further, any number of additional blocks not shown in FIG. 3 may be included within the method 300, depending on the details of the specific implementation.

Figure 4:
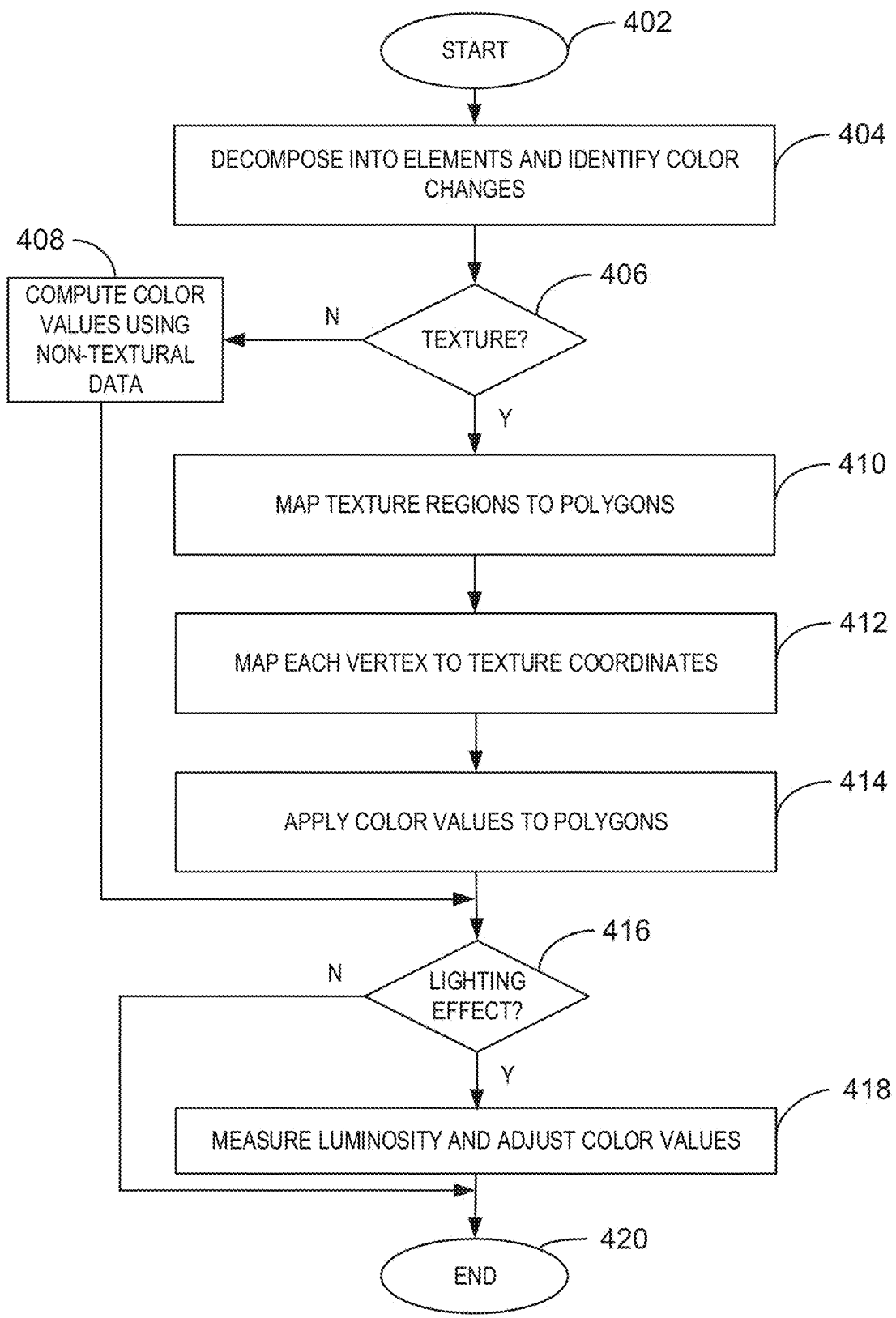
FIG. 4 is a process flow diagram of a method for computing color values for a three-dimensional model of an object.

FIG. 4 is a process flow diagram of a method 400 for computing color values for a three-dimensional model of an object. One or more hardware/software components (e.g., the fabrication manager 114 of FIG. 1) may be configured to perform the method 400. The method 400 begins at block 402 and proceeds to block 404, at which a layer of the three-dimensional model may be decomposed into elements, including geometric elements, and color changes may be identified. In various embodiments, the elements are projected onto the layer's three-dimensional plane, which is further decomposed into addressable units forming a shell corresponding to an object's geometry. The color changes may occur between units within the layer and/or between adjacent layers.

At block 406, it may be determined whether texture information is available. The texture information describes the pattern or specific color bitmap to apply on a three-dimensional surface mesh model in one or more external files. The three-dimensional surface mesh model may be exported with the texture information as part of a native file format. The same texture information may be used for multiple polygonal faces. Different regions in a texture might be mapped to different polygons.

If the texture information is not available, the method 400 proceeds to block 408. At block 408, color values may be computed for the geometric elements using non-textural data. For example, the fabrication manager may generate color using related mathematical functions, such as linear or radial gradients, rainbow patterns, and/or other mathematically defined procedures. From block 408, the method proceeds to block 416, as discussed below.

If the texture information is available, the method 400 proceeds to block 410, at which texture regions may be mapped to polygons. One exemplary texture mapping mechanism employs a mesh model that has been pre-sliced into polygonal geometries and maps the texture region to the entirety of the polygonal geometry on the layer. At block 412, each vertex may be mapped to texture coordinates in the texture regions. In addition, the texture coordinates may be scaled in both dimensions to map directly to the vertices of the polygonal face. At block 414, color values may be applied to the polygons. The fabrication manager may be instructed to apply texture information to the three-dimensional model to produce color values. As the fabrication manager identifies a tool path for printing a shell of the three-dimensional object, the fabrication manager also identifies colors that need to be applied to the outside shell (surface mesh) of the object using the texture information associated with the model. From block 414, the method 400 then proceeds to block 416.

At block 416, it may be determined whether to add a lighting effect. If a lighting effect is not desired, the method 400 terminates at block 420. Otherwise, if a lighting effect is to be added, the method 400 proceeds to block 418. At block 418, the luminosity may be measured, and the color values may be adjusted. The three-dimensional model may include lighting information providing a variety of effects, such as simulating an object having bright colors as if the object was fully sunlit or muting or shading colors as if the object is in a darkened location. The lighting information may have an intrinsic color that modifies a non-illuminated color value of the model. The adjustment to the color value may simulate lights of various colors shining on the texture of the object, making the object appear as if light were pointing at the model. The method 400 then terminates at block 420.

The process flow diagram of FIG. 4 is not intended to indicate that the blocks 402-420 of the method 400 are to be executed in any particular order, or that all of the blocks 402-420 are to be included in every case. Further, any number of additional blocks not shown in FIG. 4 may be included within the method 400, depending on the details of the specific implementation.

Figure 5:
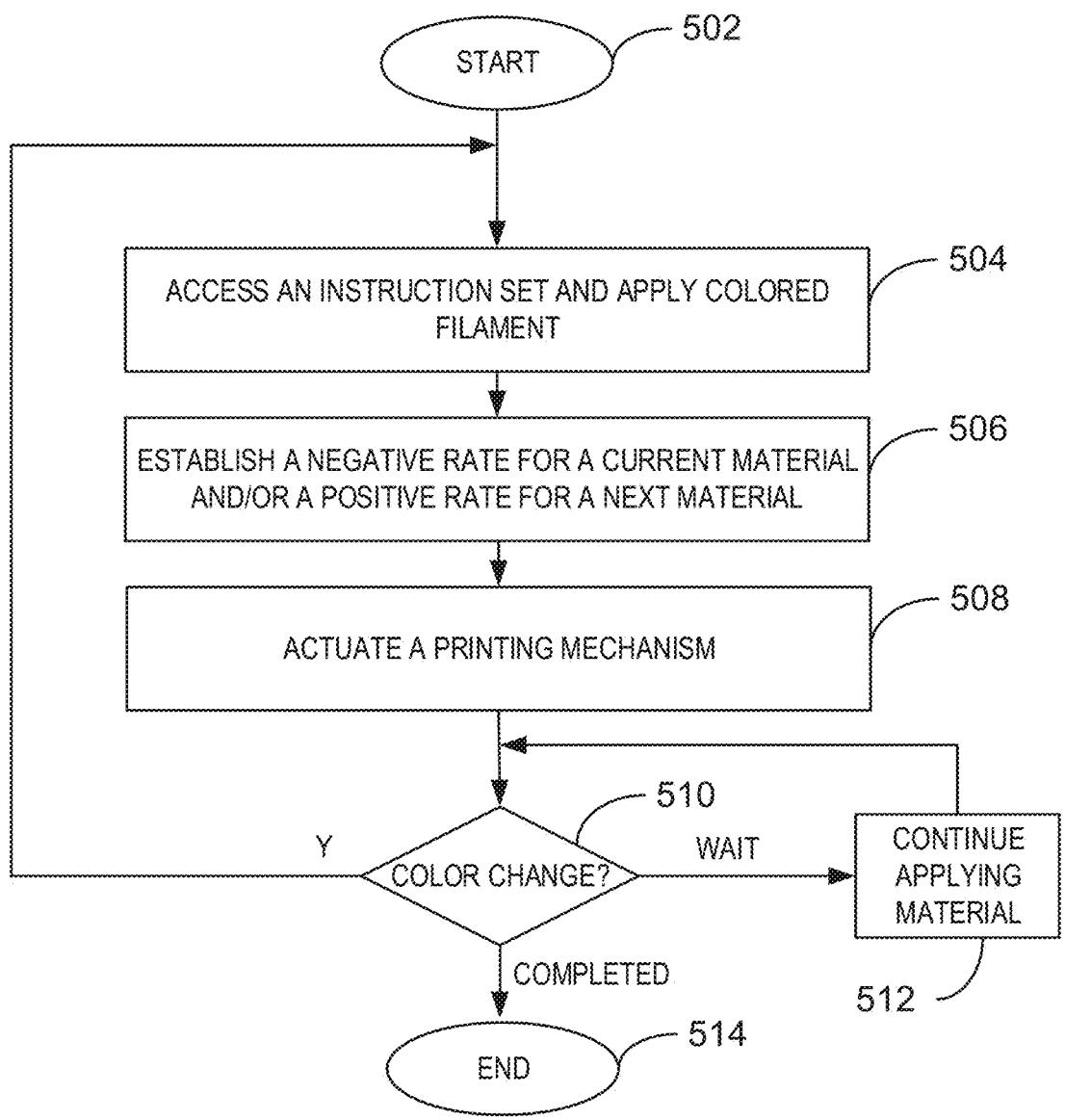
FIG. 5 is a process flow diagram of a method for fabricating a full color three-dimensional object by executing specific instructions.

FIG. 5 is a process flow diagram of a method 500 for fabricating a full color three-dimensional object by executing specific instructions. In various embodiments, the method 500 is executed by a fabrication device (e.g., the fabrication device 100 of FIG. 1). For example, one or more hardware/software components (e.g., the controller 102 of FIG. 1) of a robotic mechanism (e.g., the first mechanism 104 of FIG. 1) may be configured to perform the method 500 by executing instructions provided by other hardware/software components (e.g., the fabrication manager 114 of FIG. 1). The method 500 begins at block 502 and proceeds to block 504. At block 504, a coordinated instruction set may be accessed and executed, commencing a three-dimensional object fabrication process during which colored filament is applied to the three-dimensional object.

At block 506, a negative rate may be established for a current filament(s) and/or a positive rate may be established for a next filament(s). The coordinated instructions prescribe that these rates be achieved in substantial synchronicity. At block 508, a printing mechanism may be actuated in accordance with the coordinated instructions. The coordinated instructions define tool paths configured to change color in advance of where a next colored filament is expected by eliminating a previous color, for example, by clearing an extruder configuration's mixing chamber of the previous color. For example, if yellow filament is being deposited and green filament is the next color, the coordinated instructions may cause the extruder configuration to begin feeding the cyan material such that the correct mixture of colored material reaches the extruder configuration's nozzle when the green filament is expected. Additionally, the extruder configuration may change the colored filament and start the infill procedure on the next layer. When a sufficient amount of colored material has passed through the extruder configuration's mixing chamber to provide the desired green color for an outside shell, any transitional material may be purged into an infill area, one or more external support structures, or any other non-critical area. This allows for sudden dramatic color changes on an exterior of the three-dimensional object while maintaining transitional material in an inside shell. Alternatively, the transitional material may be utilized for structural support.

In various embodiments, color changes are executed using knowledge of the current color in the tube and the previously calculated tool paths. This may allow for a 'smart mixing' process, during which an extruder motor associated with each base color of filament starts feeding filament at a specific rate (e.g., a positive or negative rate) and adjusts as new colored material is pushed into the chamber. For example, if the current color is yellow and the print needs green, instructions may be sent to slightly retract the yellow filament and push in a slightly larger amount of cyan to mix with the existing yellow in the chamber. This process may be applied gradually, adjusting the feed rates of both colors over time until reaching the desired mix in the chamber. Then, the system may follow with the usual values/ratios for making the appropriate green color.

At block 510, the printing mechanism may be monitored for the pending color change, and the moment when a new color is expected may be determined. When that moment arrives, the method 500 returns to block 504 for the execution of the next instruction. If that moment has not been reached after a certain amount of time, the method 500 proceeds to block 512. At block 512, the current color's filament may continue to be applied for a period of time (e.g., a few seconds) before looping back around to block 510. If it is determined at block 510 that the printing mechanism has completed the fabrication process, the method 500 terminates at block 514.

The process flow diagram of FIG. 5 is not intended to indicate that the blocks 502-514 of the method 500 are to be executed in any particular order, or that all of the blocks 502-514 are to be included in every case. Further, any number of additional blocks not shown in FIG. 5 may be included within the method 500, depending on the details of the specific implementation.

Figure 6A:
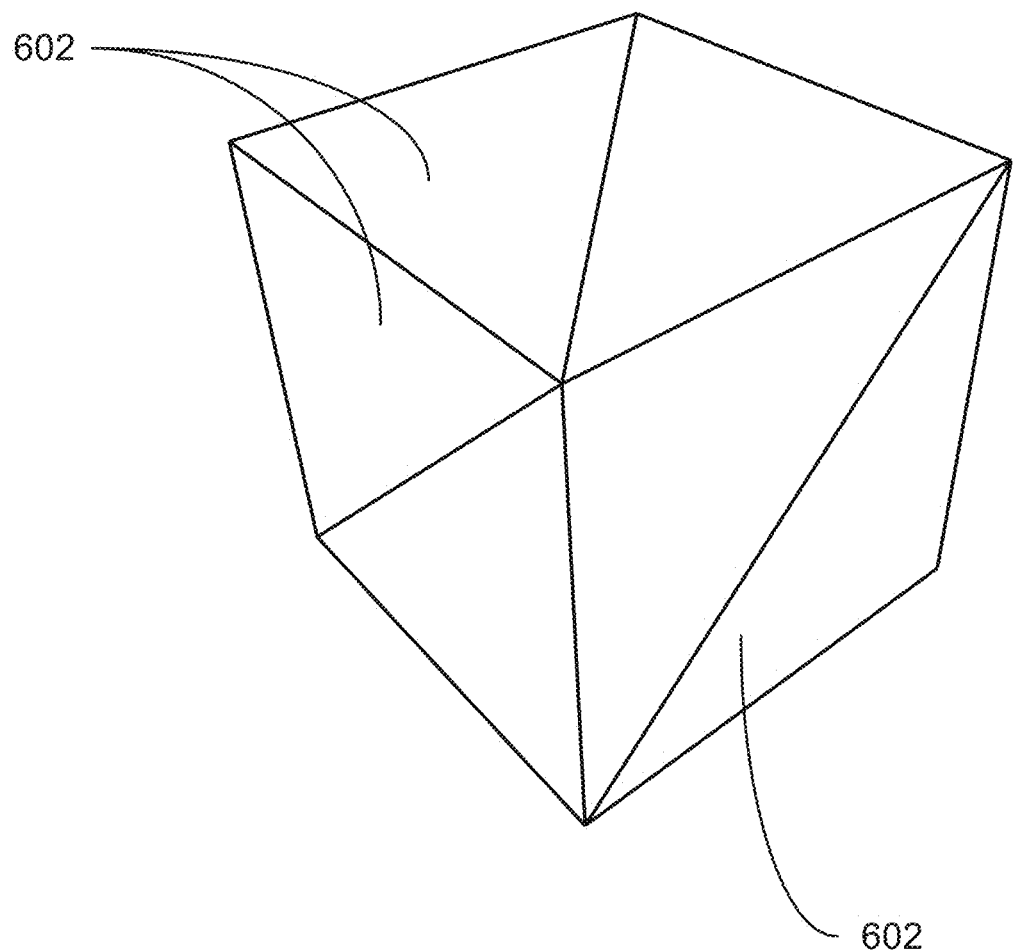
FIG. 6A is a schematic showing a three-dimensional model that may be used according to embodiments described herein.

FIG. 6A is a schematic showing a three-dimensional model 600 that may be used according to embodiments described herein. The three-dimensional model 600 is represented as a mesh including faces 602. In the embodiment shown in FIG. 6A, the faces 602 are made up of triangles. However, it is to be understood that the faces 602 may be made up of rectangles or other types of polygons. It is also understood that faces may be curved surfaces that might be approximated by line-fitting polygonization algorithms.

Figure 6B:
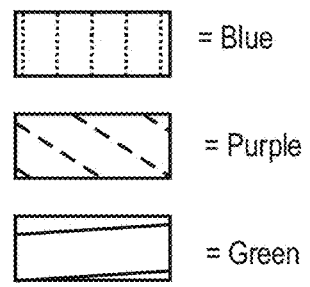
FIG. 6B is a schematic showing the three-dimensional model with colors on the faces.
Figure 6B:
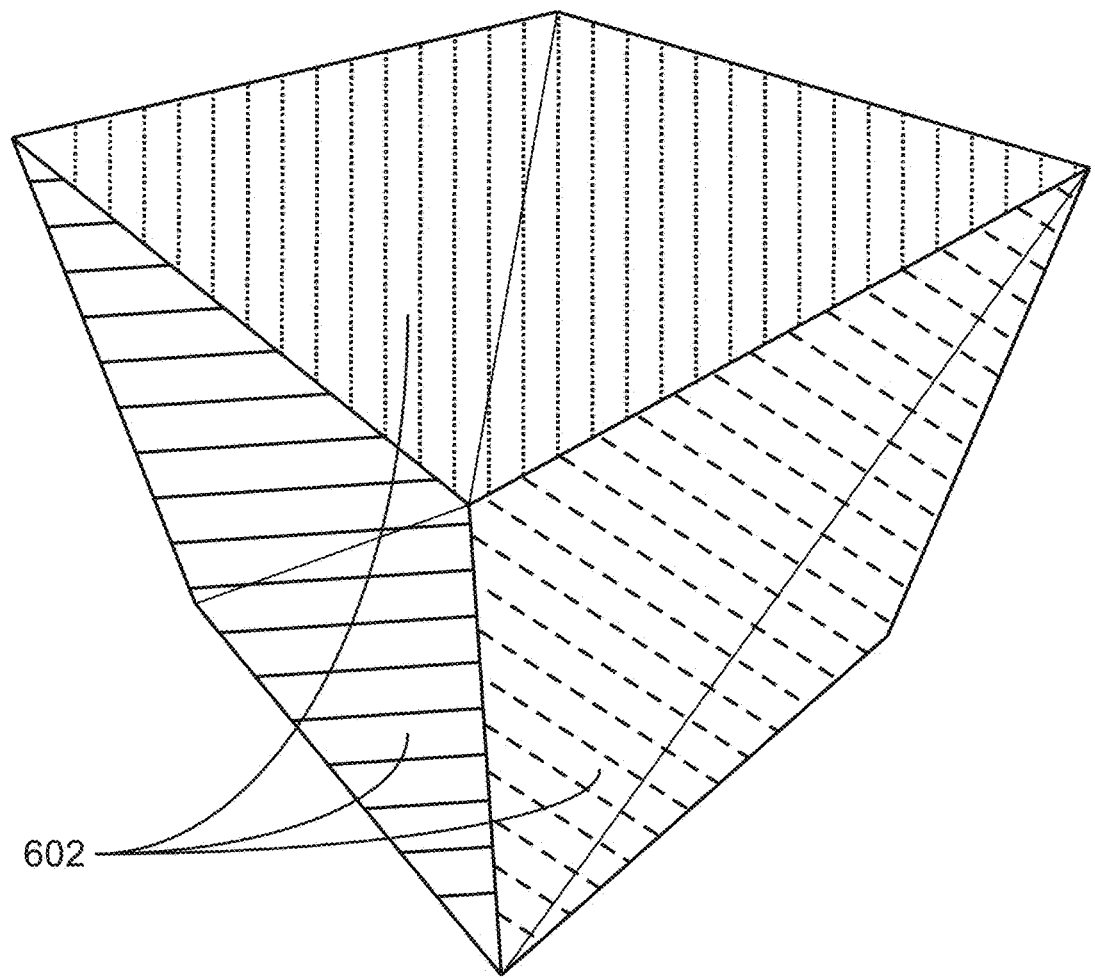
Figure 6C:
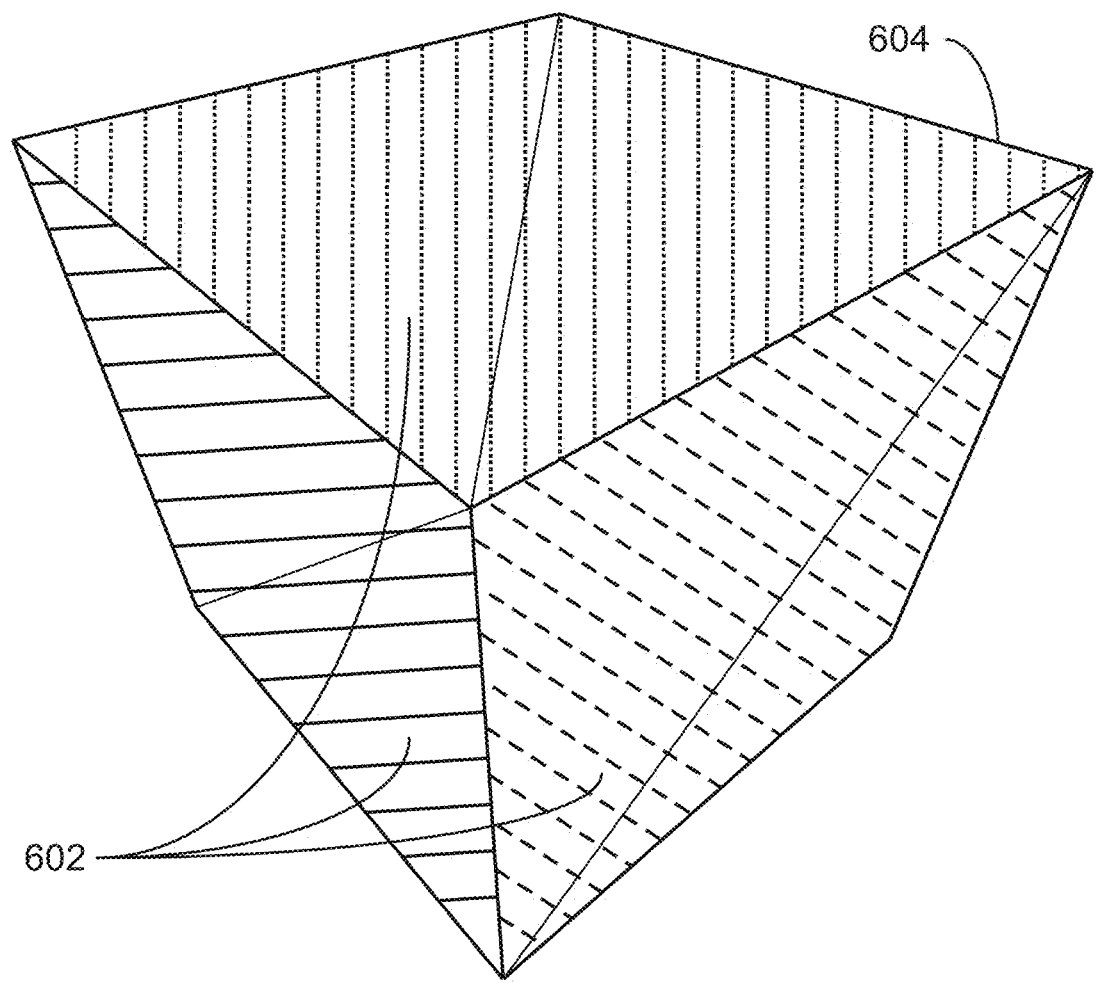
FIG. 6C is a schematic showing the three-dimensional model broken down into layers according to the layer-by-layer process.
Figure 6D:
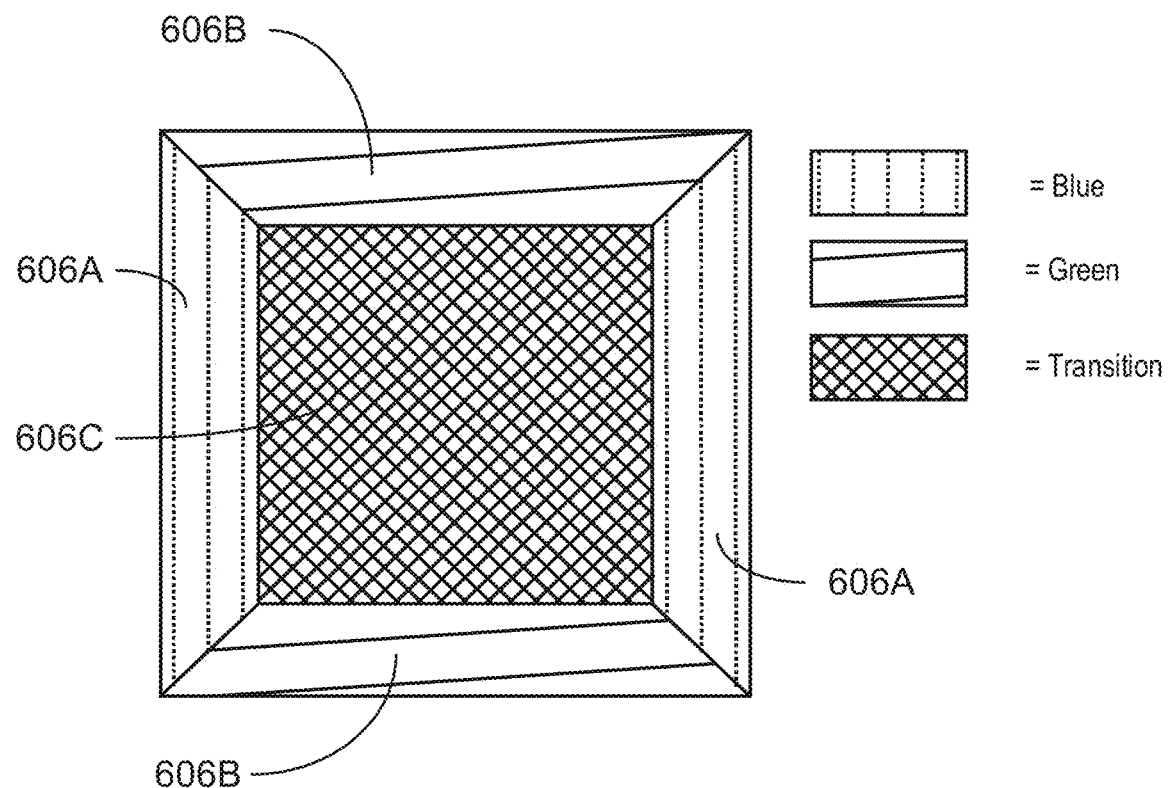
FIG. 6D is a schematic showing the resulting two-dimensional polygons for a single layer of the three-dimensional model.

FIG. 6B is a schematic showing the three-dimensional model 600 with colors on the faces 602. As shown in FIG. 6B, each face 602 is monochromatic, but every face 602 can have a different color. In various embodiments, the fabrication manager calculates the intersection segments between the current Z plane and the triangular mesh of the three-dimensional model 600. The fabrication manager may then take the color (RBGA) values from the faces 602 to the segments intersected with the faces 602. This is a layer-by-layer process, which allows for the preservation of the color information onto two-dimensional polygons for every layer. FIG. 6C is a schematic showing the three-dimensional model 600 broken down into layers 604 according to the layer-by-layer process. FIG. 6D is a schematic showing the resulting two-dimensional polygons 606A-C for a single layer 604 of the three-dimensional model 600. Polygons 606A represent the blue material. Polygons 606B represent the green material. Polygons 606C represent the inner transitional material, i.e., the infill area.

According to embodiments described herein, the three-dimensional model may also be sliced with colors on textures according to a central processing unit (CPU) based texture mapping process. Color values from texture are different from color values on faces because the boundaries do not divide color into different regions.

In various embodiments, the fabrication manager begins by slicing the geometry and generating the two-dimensional polygons while ignoring the texture. Then, the fabrication manager may perform texture mapping on the two-dimensional polygons. This process may add more vertices into the two-dimensional polygons based on the color information on the texture. The two-dimensional polygons may be refined such that every segment has a single color.

Figure 7A:
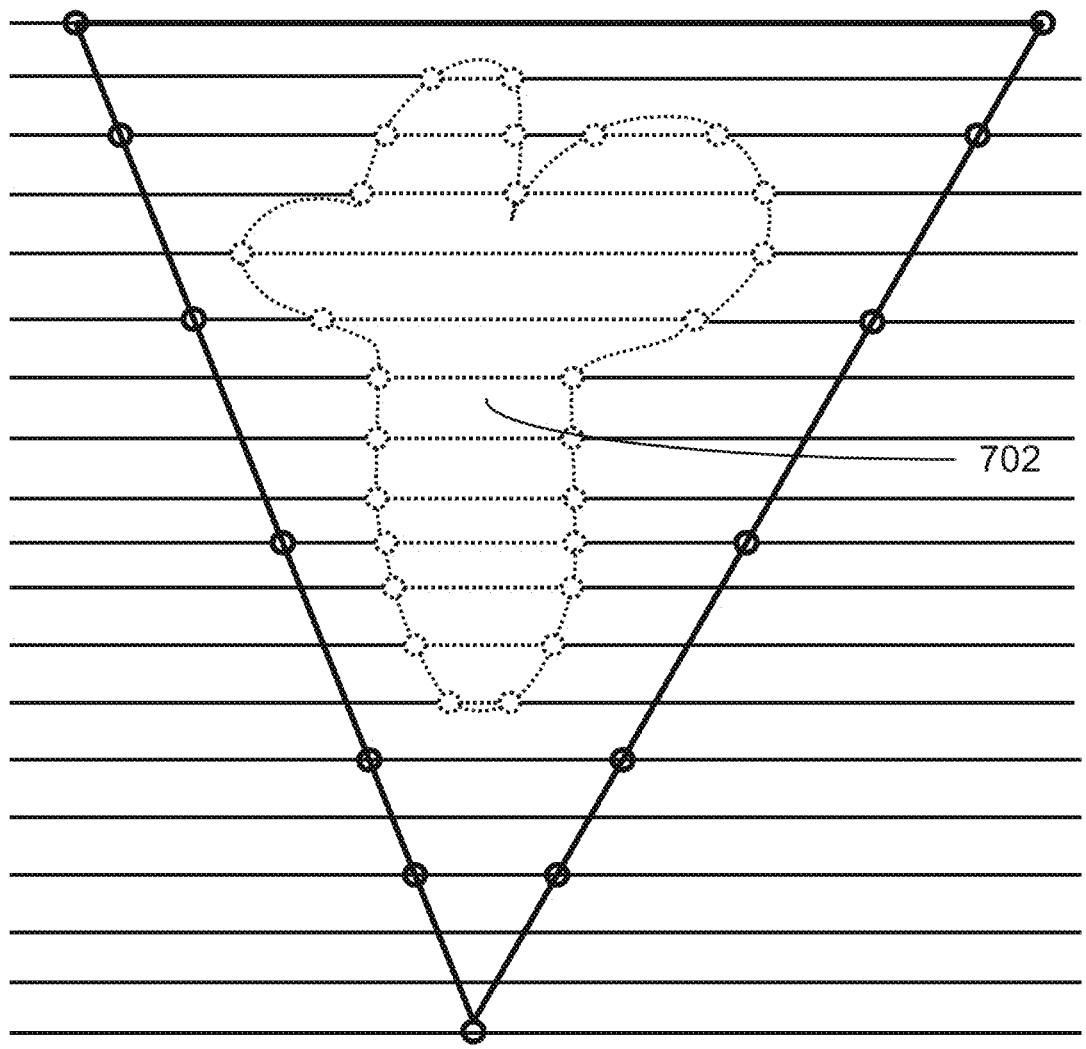
FIG. 7A is a schematic showing a face with added vertices.
Figure 7B:
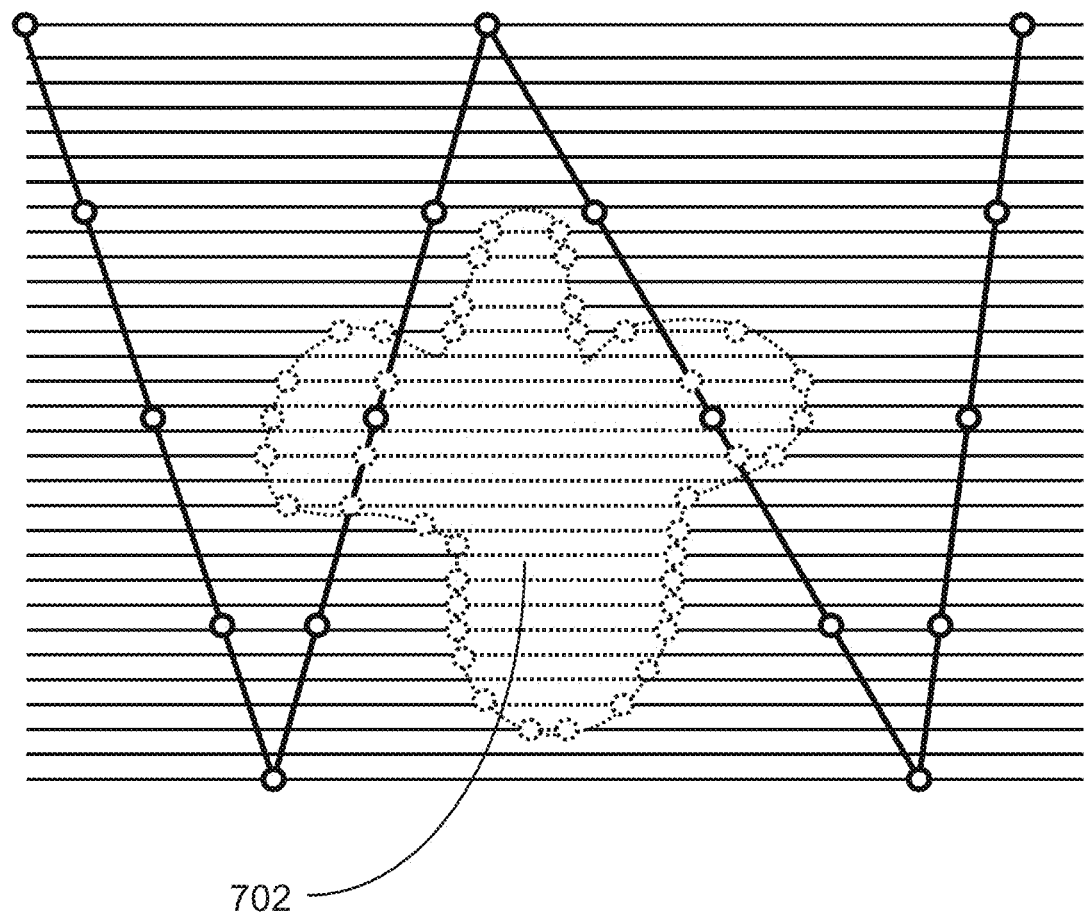
FIG. 7B is a schematic showing multiple faces with added vertices.

FIG. 7A is a schematic showing a face 700 with added vertices. Specifically, FIG. 7A depicts the process of adding vertices into a segment for three layers when there is a red flower 702 inside the face 700. FIG. 7B is a schematic showing multiple faces 704 with added vertices. Specifically, FIG. 7B depicts the same process as FIG. 7A, except the red flower is mapped onto multiple faces 704 rather than only one face 700.

Figure 8A:
FIG. 8A is a schematic showing a surface of a geometry with gradient color.
Figure 8A:
Figure 8A:
Figure 8A:
Figure 8A:
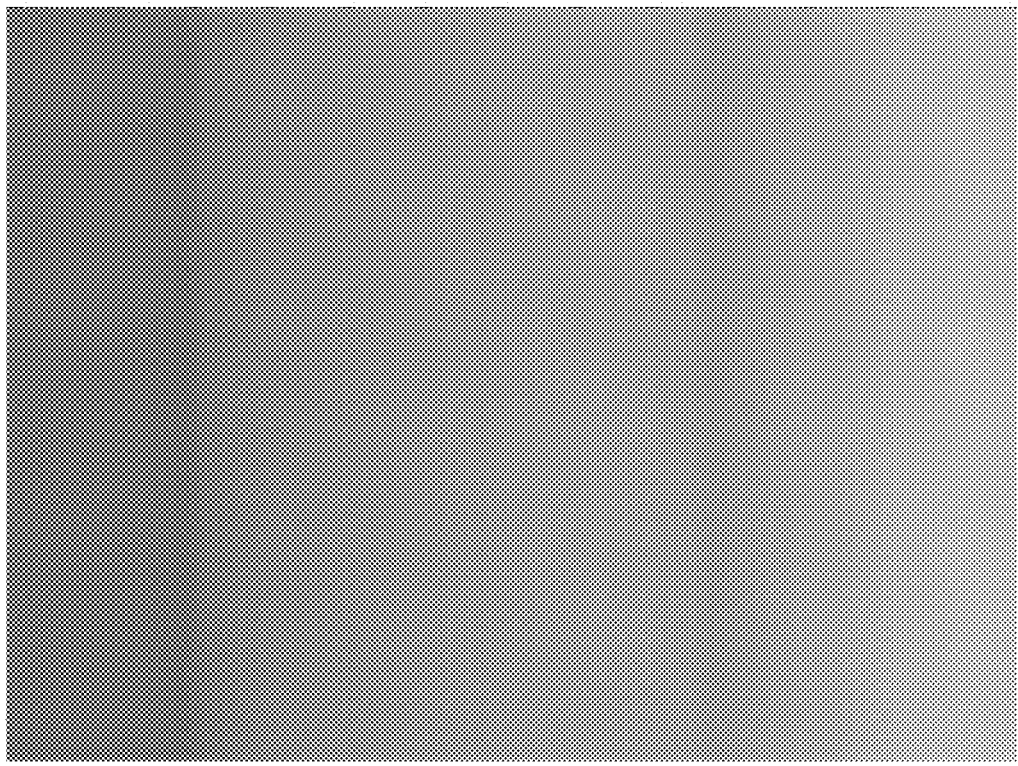
Figure 8B:
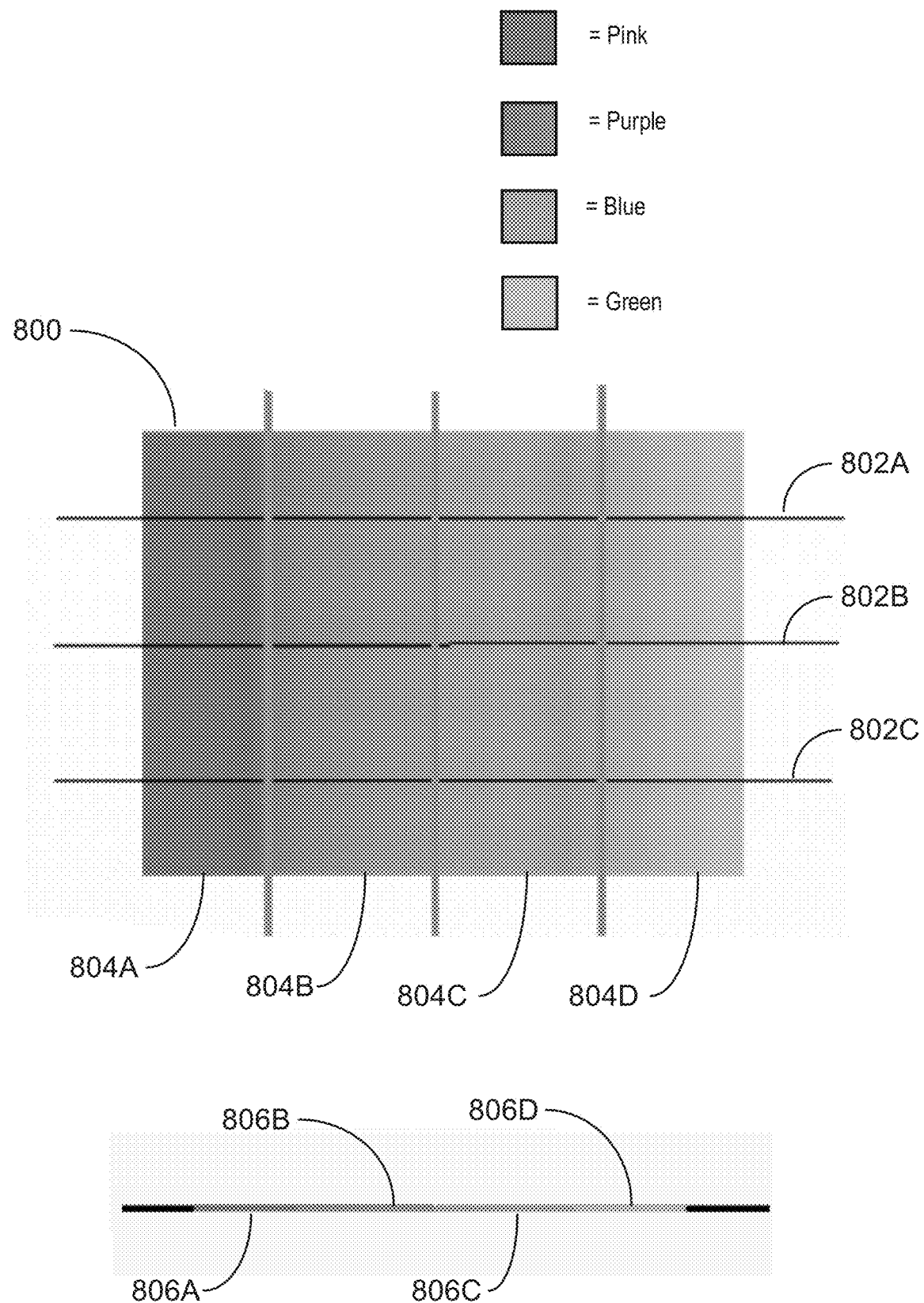
FIG. 8B is a schematic showing the surface broken down into three layers.

According to embodiments described herein, the three-dimensional model may also be sliced with gradient color. Slicing with gradient color is not a simple task because continuous color changes are difficult to control from a color mixing point of view. The task may be simplified by allowing every segment to have a single color but using many small segments to simulate the color gradient through interpolation of color into stepped, discrete segments. An example is shown in FIGS. 8A and 8B. FIG. 8A is a schematic showing a surface 800 of a geometry with gradient color. In various embodiments, the fabrication manager creates polygons based on the geometric information. The polygons may then be refined with more vertices to ensure that every polygon is small enough and includes only one color. The color value for each polygon may be assigned as the color value of the polygon's middle point. FIG. 8B is a schematic showing the surface 800 broken down into three layers 802A-C. Based on a predefined length, the gradient color may be simulated using four polygons 804A-D, each with different color. A color value 806A-D may then be assigned to each polygon 804A-D, respectively, according to the color value of each polygon's middle point.

Figure 9:
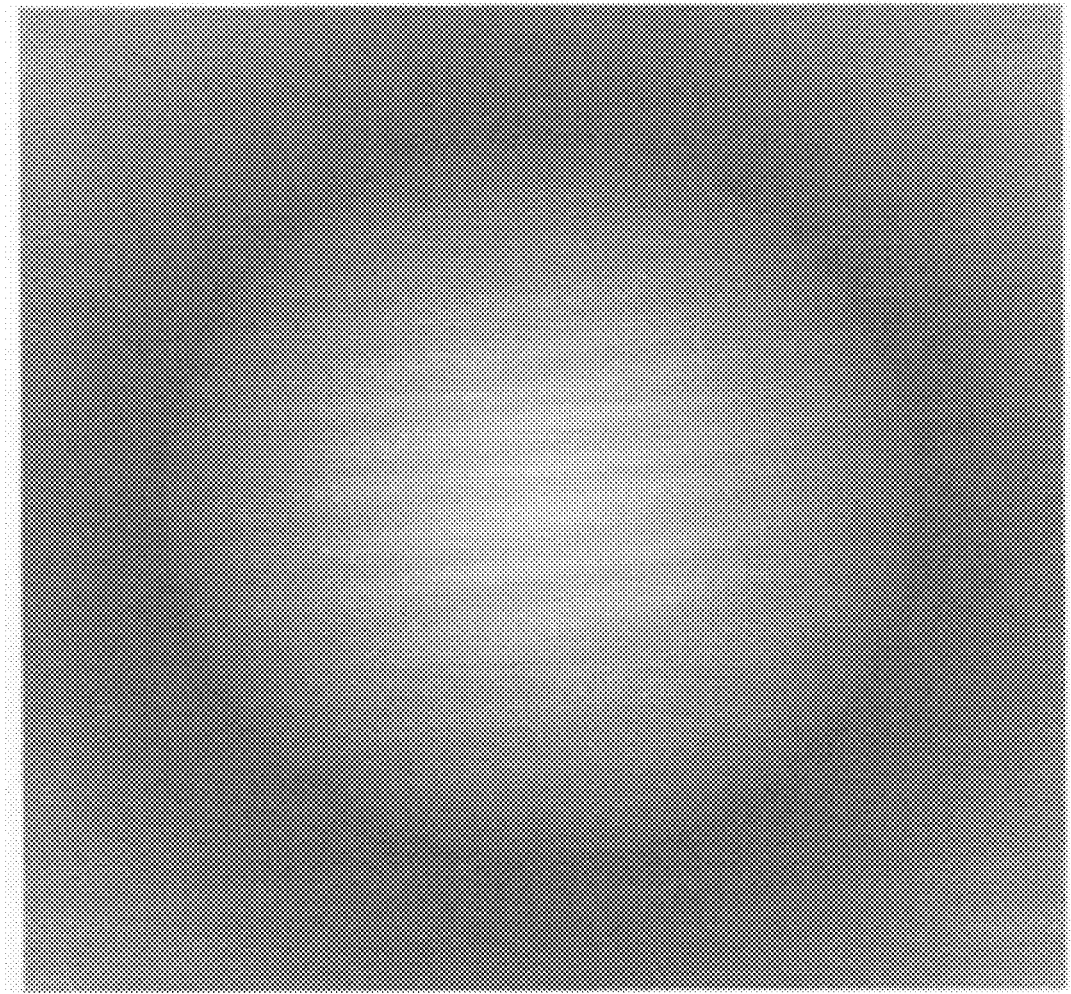
FIG. 9 is a schematic showing a radial gradient that may be used according to embodiments described herein.
Figure 10:
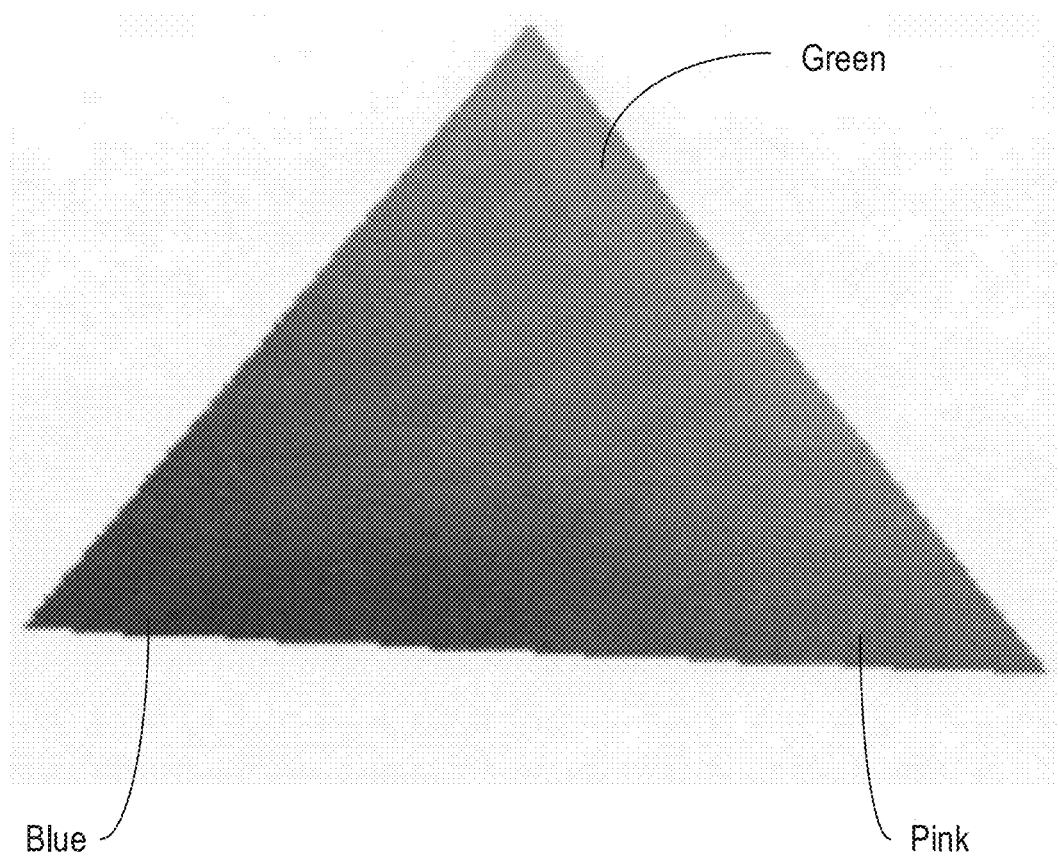
FIG. 10 is a schematic showing a triangular gradient that may be used according to embodiments described herein.

It is to be understood that the embodiments described herein are not limited to the rectangular gradient shown in FIGS. 8A and 8B. Rather, any suitable type of gradient may be used. For example, FIG. 9 is a schematic showing a radial gradient 900 that may be used according to embodiments described herein. In addition, FIG. 10 is a schematic showing a triangular gradient 1000 that may be used according to embodiments described herein.

According to embodiments described herein, the fabrication manager may create a tool path optimization process to smooth the exterior of a full color three-dimensional object when switching colors during the fabrication process. During the fabrication process, the print head has to switch colors when moving along the tool path. However, switching colors on the exterior will introduce small bubbles on the exterior, reducing the quality of the exterior. Therefore, the tool path optimization process described herein may provide for color switching inside the object. Furthermore, in various embodiments, a different kind of optimization can be used to sequence the polygons of various colors on a layer to minimize mixing time. In an example with cyan, yellow, and green colors, all polygons of cyan may be printed first, then all polygons of green, then all polygons of yellow. This order is useful because it takes less time to go from cyan to green than from cyan to yellow. An example is shown in FIGS. 11A and 11B.

Figure 11A:
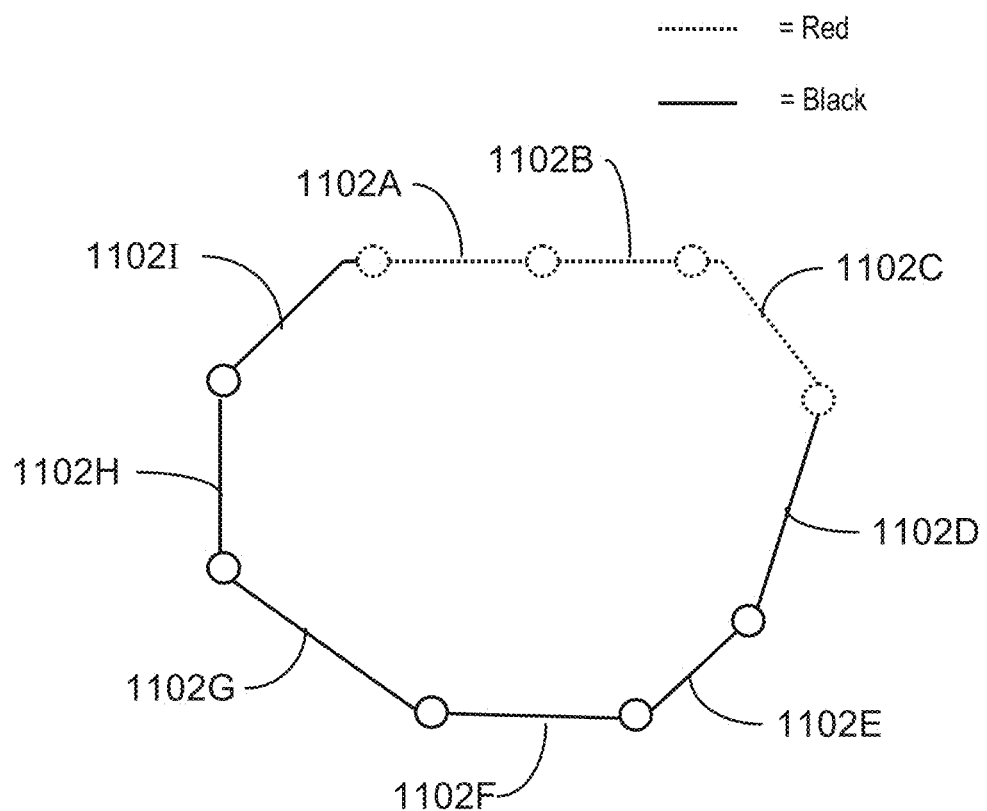
FIG. 11A is a schematic showing a polygon with nine segments of two different colors.
Figure 11B:
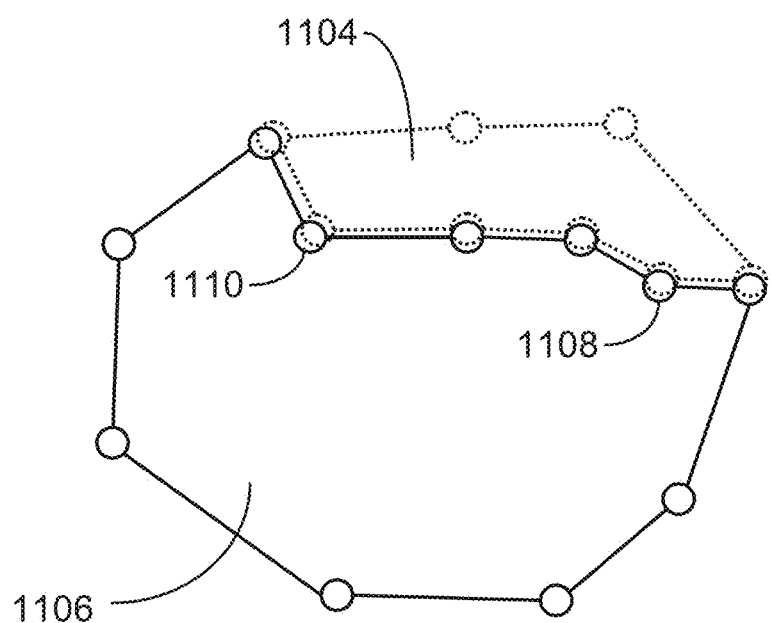
FIG. 11B is a schematic showing the polygon with the resulting closed red polygon and closed black polygon.

FIG. 11A is a schematic showing a polygon 1100 with nine segments 1102A-I of two different colors. Specifically, the polygon includes three red segments 1102A-C and six black segments 1102D-I. The fabrication manager may begin the tool path optimization process by determining that the black color is the background color based on the total length of the segments. The fabrication manager may then create offset for the red segments to change the red segments to a closed polygon. Next, the fabrication manager may change the black segments to a closed polygon with overlapping edges. FIG. 11B is a schematic showing the polygon 1100 with the resulting closed red polygon 1104 and closed black polygon 1106.

To perform the fabrication process, the tool head may start at one of the internal vertices. To increase the stability of the material path, it is desirable to ensure that the tool head has enough distance before it moves out onto the exterior. As a result, the fabrication manager may direct the tool head to start from the first internal vertex and move in a clockwise loop along the segments. For example, the tool head may begin at internal vertex 1108 for the color red and may begin at internal vertex 1110 for the color black, as shown in FIG. 11B.

According to embodiments described herein, the tool path optimization process created by the fabrication manager may also allow for the minimization of material usage when switching colors. When switching colors in the single extruder of the fabrication device, a certain length of the material is used to clean up the chamber. This may result in wasted material. Accordingly, the tool path optimization process described herein is designed to minimize the amount of wasted material. This may be accomplished by minimizing the number of color switches. If the three-dimensional model includes multiple polygons with the same color, then those polygons may all be drawn before switching to the next color.

It is to be understood that the tool path optimization process and the fabrication process described above are not limited to the application of color material to the object. Rather, the processes may be used to apply any number of different types of materials to the object. When different types of materials are used, the fabrication manager may direct the tool head to switch materials in the same manner as described above with respect to switching colors during the fabrication process.

A fabricated three-dimensional object typically has internal infill and external supports. The internal infill material is invisible after the printing process finishes, and the external supports are removed after fabrication. Therefore, according to the tool path optimization process described herein, the transitional material can be used to create the infill and supports.

In various embodiments, the length of material that the tool path will use to switch colors safely is defined as "Lc." Based on the polygon region and the radius of the filament, the maximum length of material that the tool path will use can be calculated for a solid polygon. This maximum length may be defined as "Ls." The number of different colors may be defined as "N." Using these variables, it can be determined whether there is transitional material for the polygon. Specifically, if $Lc \times (N-1) \leq Ls$ for a particular polygon, then there is no transitional material for the polygon. However, if $Lc \times (N-1) > Ls$ for the polygon, then there is transitional material, and the tool head is to be moved outside the three-dimensional object after the polygon becomes solid.

Figure 12:
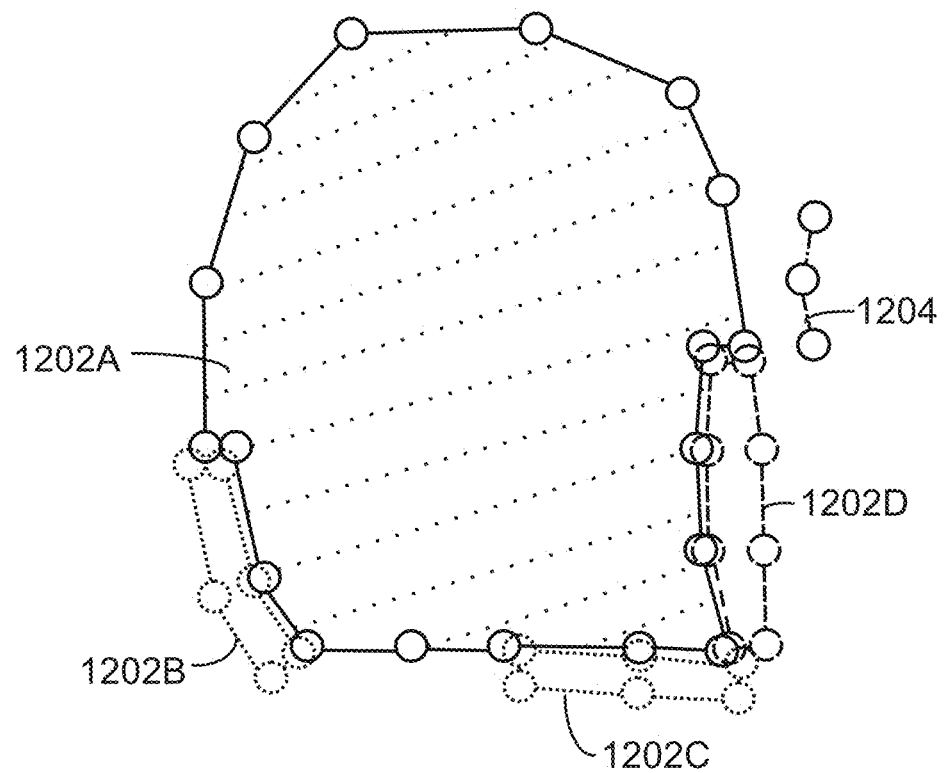
FIG. 12 is a schematic showing a layer of a three-dimensional model including several polygons of different colors, as well as an external support structure.

FIG. 12 is a schematic showing a layer 1200 of a three-dimensional model including several polygons 1202A-D of different colors, as well as an external support structure 1204. To simplify the task described above, only the black background polygon 1202A may be kept empty. The other polygons 1202B-D may be solid, and each polygon 1202B-D may have a width of 4×Rm, where "Rm" is the radius of the material line. According to this exemplary implementation, there is only one black background polygon 1202A for applying the infill algorithm. The density of the infill area within the black background polygon 1202A and the density of the external support structure 1204 may be calculated to make sure the total length of color switching tool paths is equal to $Lc \times (N-1)$.

According to the exemplary implementation shown in FIG. 12, the tool head may first draw the two red polygons 1202B and 1202C with red color. Then, the tool head may draw the infill and external support tool paths with a distance equal to Lc in order to switch colors based on the next polygon, which is the blue polygon 1202D. After the tool head finishes switching colors, the tool head may draw the blue polygon 1202D. In this manner, all transitional material is either hidden within the infill area of the black background polygon 1202A or deposited within the disposable external support structure 1204. This allows the transitional material to be used for the fabrication process rather than wasted, thus reducing costs and increasing the efficiency of the fabrication process.

Figure 13:
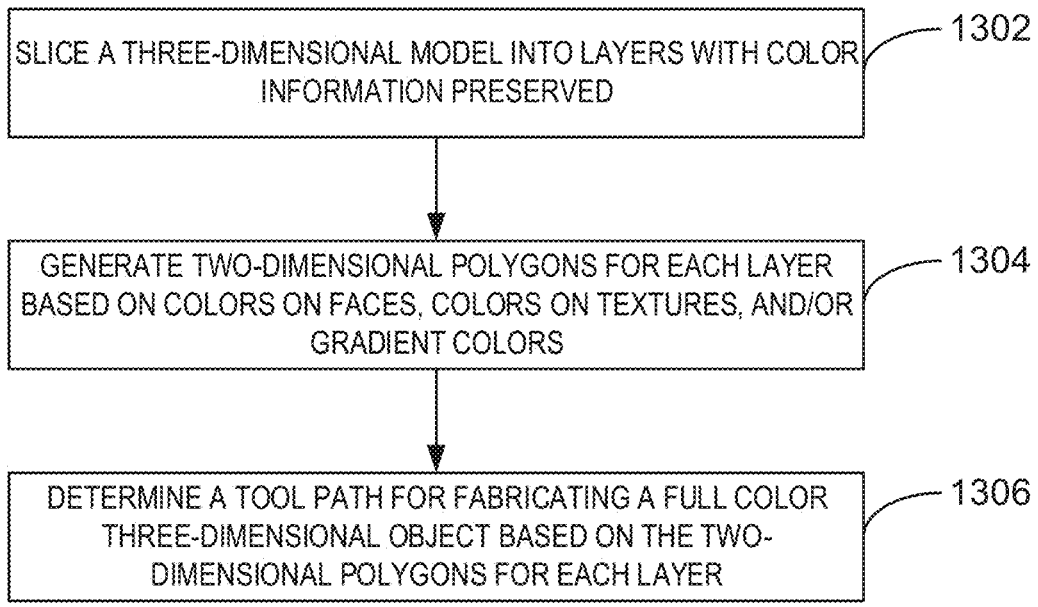
FIG. 13 is a process flow diagram of a method for transforming a three-dimensional model of a physical object into instructions for a fabrication device.

FIG. 13 is a process flow diagram of a method 1300 for transforming a three-dimensional model of a physical object into instructions for a fabrication device. The method 1300 may be executed by a computing device with three-dimensional printing capabilities. More specifically, the method 1300 may be executed by a computing device including a fabrication manager, such as the fabrication manager 114 of FIG. 1, that is communicably coupled to a fabrication device, such as the fabrication device 100 of FIG. 1.

The method begins at block 1302, at which the three-dimensional model is sliced into layers with color information preserved. At block 1304, two-dimensional polygons are generated for each layer based on colors on faces, colors on textures, and/or gradient colors. Each two-dimensional polygon includes a single color. In various embodiments, generating two-dimensional polygons for a layer based on colors on faces includes calculating intersection segments between a plane of a current layer and a mesh of the three-dimensional model, obtaining color values for the intersection segments, and translating the color values onto two-dimensional polygons for the layer. In addition, generating two-dimensional polygons for a layer based on colors on textures may include generating two-dimensional polygons for the layer, performing texture mapping on the two-dimensional polygons by adding additional vertices to the two-dimensional polygons based on color information on a texture map of the object being fabricated, and refining the two-dimensional polygons such that every segment includes a single color. Furthermore, generating the two-dimensional polygons for each layer based on gradient colors may include generating two-dimensional polygons based on geometric information corresponding to the three-dimensional model, refining the two-dimensional polygons such that every segment includes a single color, and assigning a color value to each two-dimensional polygon based on a color of a middle segment of each two-dimensional polygon.

At block 1306, a tool path for fabricating a full color three-dimensional object from colored materials is determined based on the two-dimensional polygons for each layer. Determining the tool path includes generating instructions that direct the fabrication device to apply colored material for all two-dimensional polygons of a same color before switching colors, smooth an exterior of the full color three-dimensional object by switching colors at an internal vertex of each two-dimensional polygon within each layer, and deposit transitional material within an infill area, a support structure, and/or an area outside the full color three-dimensional object when switching colors. In various embodiments, smoothing the exterior of the full color three-dimensional object by switching colors at the internal vertex of each two-dimensional polygon within each layer is accomplished by applying colored material for a two-dimensional polygon of a particular color beginning at an internal vertex of the two-dimensional polygon and moving in a direction that provides a greatest distance before reaching an exterior vertex. In addition, depositing transitional material within the infill area, the support structure, and/or the area outside the full color three-dimensional object when switching colors may be accomplished by calculating the length of colored material that will be used while switching colors, determining whether transitional material will be generated based on the calculated length, and if transitional material will be generated, depositing the transitional material within the infill area, the support structure, and/or the area outside the full color three-dimensional object.

The process flow diagram of FIG. 13 is not intended to indicate that the blocks 1302-1306 of the method 1300 are to be executed in any particular order, or that all of the blocks 1302-1306 are to be included in every case. Further, any number of additional blocks not shown in FIG. 13 may be included within the method 1300, depending on the details of the specific implementation. For example, in various embodiments, the geometry is sliced with material information. The process for slicing the geometry with material information is similar to the process described above for slicing the geometry with color information. Specifically, in such embodiments, transforming the three-dimensional model into instructions for the fabrication device includes slicing the three-dimensional model into layers with material information preserved and generating two-dimensional polygons for each layer based on material information on faces, material information on vertices, and/ or gradient material information. Each two-dimensional polygon includes a single type of material. A tool path for fabricating the object may then be determined based on the two-dimensional polygons for each layer. Determining the tool path may include generating instructions that direct the fabrication device to apply a specified material for all two-dimensional polygons of a same material before switching materials, smooth an exterior of the object by switching materials at an internal vertex of each two-dimensional polygon within each layer, and deposit transitional material within an infill area, a support structure, and/or an area outside the object when switching materials. This process may be used to apply a variety of different types of materials to the object, such as transparent material, rubberlike material, dissolvable material, or the like. Such materials may be applied in addition to the color materials described above with respect to FIG. 13.

Further, in some embodiments, the fabrication device may include multiple tool heads, wherein each tool head includes a different type of material. In such embodiments, the system memory may include code configured to generate instructions that direct the fabrication device to switch tool heads at appropriate time intervals such that the outside surface of the full color three-dimensional object is uniform or smooth. Specifically, the instructions may direct the fabrication device to switch tool heads at an internal vertex of each two-dimensional polygon within each layer by generating instructions that direct the fabrication device to apply a material for a two-dimensional polygon beginning at an internal vertex of the two-dimensional polygon and moving in a direction that provides a greatest distance before reaching an exterior vertex. This may allow the fabrication device to use several different tool heads to evenly and smoothly apply several different types of materials. Such materials may include, in addition to color materials, transparent materials, rubberlike materials, dissolvable materials, or the like.

It is to be understood that embodiments described herein are not limited to any particular type of material. Rather, any number of different types of materials may be used. Such materials can be deposited through a jetted, extruded, or other mechanical or chemical process. Each material may exhibit different physical characteristics in any number of dimensions. Such physical characteristics may include, for example, flexibility, resiliency to impact, resistance to solvents or temperature, or ability to carry colorants. Furthermore, materials may be blended in different ratios to create hybrid materials with yet further differing physical characteristics. Embodiments described herein are suitable for defining regions of the finished object that have differing material compositions.

Figure 14:
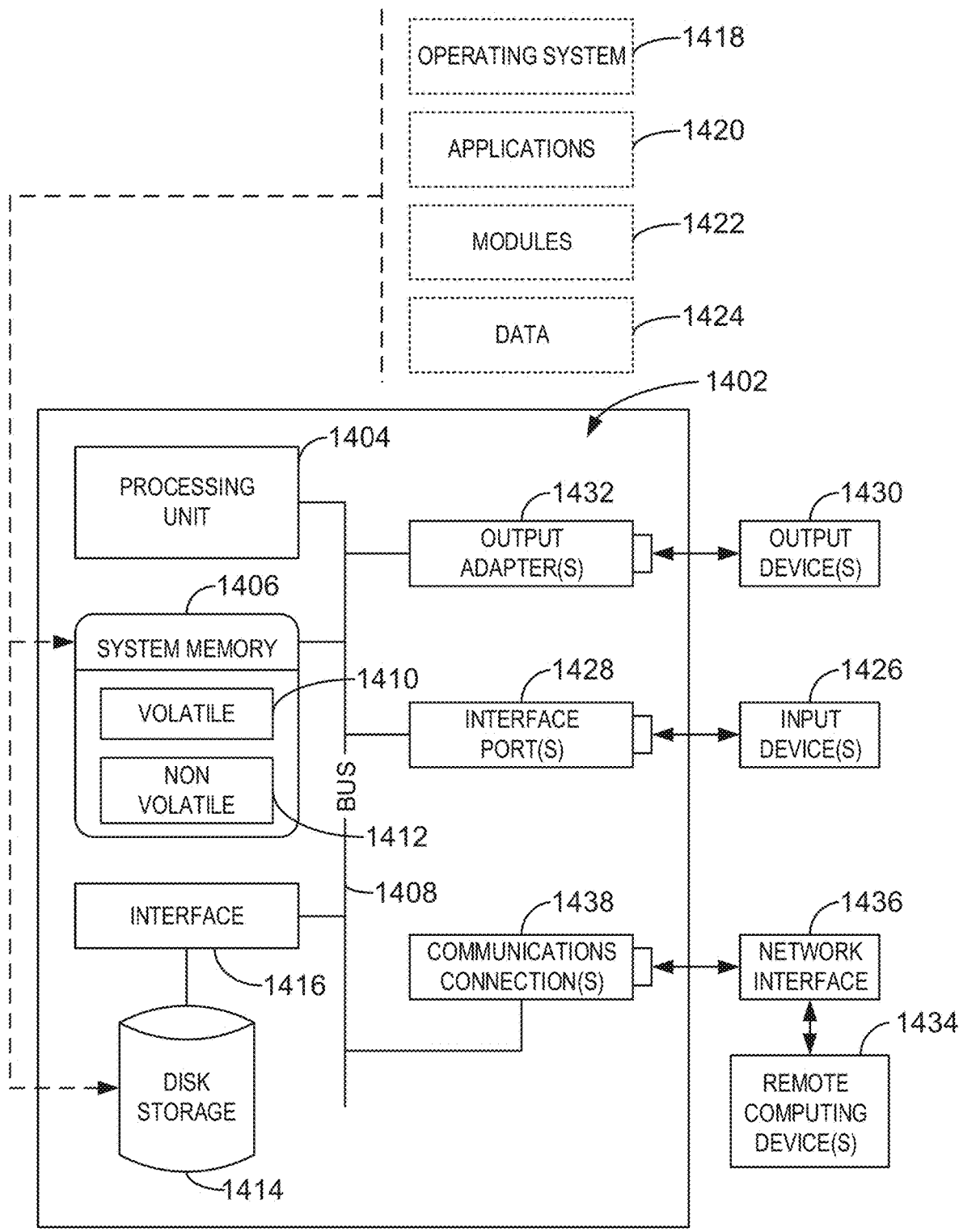
FIG. 14 is a block diagram of a computing environment that may be used to implement a system and method for fabricating full color three-dimensional objects.

In order to provide context for implementing various aspects of the claimed subject matter, FIG. 14 is intended to provide a brief, general description of a computing environment in which the various aspects of the subject innovation may be implemented. For example, a method and system for fabricating full color three-dimensional objects can be implemented in such a computing environment. While the claimed subject matter has been described above in the general context of computer-executable instructions of a computer program that runs on a local computer or remote computer, those of skill in the art will recognize that the subject innovation also may be implemented in combination with other program modules. Generally, program modules include routines, programs, components, data structures, or the like that perform particular tasks or implement particular abstract data types.

FIG. 14 is a block diagram of a computing environment 1400 that may be used to implement a system and method for fabricating full color three-dimensional objects. The computing environment 1400 includes a computing device 1402. The computing device 1402 may be a desktop computer, laptop computer, mobile device, or any other suitable type of computing device. In various embodiments, the computing device 1402 is connected to a fabrication device. The computing device 1402 may be configured to generate instructions sets and send the instructions sets to the fabrication device. The fabrication device may then use the instruction sets to fabricate full color three-dimensional objects using multiple colored materials.

In various embodiments, the computing device 1402 includes a processing unit 1404, a system memory 1406, and a system bus 1408. The system bus 1408 couples system components including, but not limited to, the system memory 1406 to the processing unit 1404. The processing unit 1404 can be any of various available processors. Dual microprocessors and other multiprocessor architectures also can be employed as the processing unit 1404.

The system bus 1408 can be any of several types of bus structures, including the memory bus or memory controller, a peripheral bus or external bus, or a local bus using any variety of available bus architectures known to those of ordinary skill in the art. The system memory 1406 is computer-readable storage media that includes volatile memory 1410 and non-volatile memory 1412. The basic input/output system (BIOS), containing the basic routines to transfer information between elements within the computing device 1402, such as during start-up, is stored in non-volatile memory 1412. By way of illustration, and not limitation, non-volatile memory 1412 can include read-only memory (ROM), programmable ROM (PROM), electrically-programmable ROM (EPROM), electrically-erasable programmable ROM (EEPROM), or flash memory.

Volatile memory 1410 includes random access memory (RAM), which acts as external cache memory. By way of illustration and not limitation, RAM is available in many forms, such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computing device 1402 also includes other computer-readable storage media, such as removable/non-removable, volatile/non-volatile computer storage media. FIG. 14 shows, for example, a disk storage 1414. Disk storage 1414 may include, but is not limited to, a magnetic disk drive, floppy disk drive, tape drive, Jaz drive, Zip drive, LS-100 drive, flash memory card, or memory stick.

In addition, disk storage 1414 can include storage media separately or in combination with other storage media including, but not limited to, an optical disk drive such as a compact disk ROM device (CD-ROM), CD recordable drive (CD-R Drive), CD rewritable drive (CD-RW Drive), or a digital versatile disk ROM drive (DVD-ROM). To facilitate connection of the disk storage 1414 to the system bus 1408, a removable or non-removable interface is typically used, such as interface 1416.

It is to be appreciated that FIG. 14 describes software that acts as an intermediary between users and the basic computing resources described in the computing environment 1400. Such software includes an operating system 1418. The operating system 1418, which can be stored on disk storage 1414, acts to control and allocate resources of the computing device 1402.

System applications 1420 take advantage of the management of resources by the operating system 1418 through program modules 1422 and program data 1424 stored either in system memory 1406 or on disk storage 1414. According to embodiments described herein, the system applications 1420 may include a fabrication manager configured to generate an instruction set. The instruction set may then be sent to a fabrication device, and the fabrication device may use the instruction set to fabricate a full color three-dimensional object using multiple colored materials. In some embodiments, the fabrication device is integrated within the computing device 1402. In other embodiments, the fabrication device is remotely connected to the computing device 1402, as discussed further below.

A user enters commands or information into the computing device 1402 through input devices 1426. Input devices 1426 can include, but are not limited to, a pointing device (such as a mouse, trackball, stylus, or the like), a keyboard, a microphone, a touch input device, a voice input device, a scanner, a digital camera, a digital video camera, a web camera, or the like. The input devices 1426 connect to the processing unit 1404 through the system bus 1408 via interface port(s) 1428. Interface port(s) 1428 can include, for example, a serial port, a parallel port, a game port, and a universal serial bus (USB). Output device(s) 1430 may also use the same types of ports as input device(s) 1426. Thus, for example, a USB port may be used to provide input to the computing device 1402 and to output information from the computing device 1402 to an output device 1430.

An output adapter 1432 is provided to illustrate that output devices 1430, such as display devices and speakers, for example, may be accessible via the output adapters 1432. The output adapters 1432 include, by way of illustration and not limitation, video and sound cards that provide a means of connection between the output device 1430 and the system bus 1408. It can be noted that other devices and/or systems of devices provide both input and output capabilities, such as remote computing device(s) 1434.

The computing device 1402 may be included within a networking environment, and may include logical connections to one or more remote computing devices, such as remote computing device(s) 1434. According to embodiments described herein, the remote computing device(s) 1434 may include one or more fabrication devices. In addition, the remote computing device(s) 1434 may include remote personal computers, laptop computers, mobile devices, servers, or the like. The remote computing device(s) 1434 may be logically connected to the computing device 1402 through a network interface 1436, and physically connected to the computing device 1402 via a communication connection 1438. In some embodiments, the remote computing device(s) 1434 may be logically connected to the computing device 1402 through a USB cable or serial cable. Furthermore, in some embodiments, data from the computing device 1402 may simply be saved onto an SD card or similar device. The SD card may then be plugged into one of the remote computing device(s) 1434, and the data may be copied onto the remote computing device for further use.

In some embodiments, network interface 1436 encompasses wired and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1438 refers to the hardware and/or software employed to connect the network interface 1436 to the system bus 1408. While communication connection 1438 is shown for illustrative clarity inside the computing device 1402, it can also be external to the computing device 1402. The hardware and/or software for connection to the network interface 1436 may include, for example, internal and external technologies such as mobile phone switches, modems including regular telephone grade modems, cable modems and DSL modems, ISDN adapters, and Ethernet cards.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for fabricating full color three-dimensional objects, comprising transforming, via a computing device comprising three-dimensional printing capabilities, a three-dimensional model into instructions for a fabrication device by:
    slicing the three-dimensional model into layers with color information preserved, the layers comprising addressable units, wherein the addressable units are associated with an amount of colored material applied during fabrication;
    determining a tool path for fabricating a full color three-dimensional object from colored materials based on the addressable units for each layer, wherein determining the tool path comprises generating instructions that direct the fabrication device to:
        apply colored material for addressable units of a same color before switching colors, the colored material to be adjusted to simulate a lighting effect based on lighting information indicating a luminosity value, the lighting effect to simulate at least one light shining on the full color three-dimensional object;
        smooth an exterior of the full color three-dimensional object by switching colors at an addressable unit within one of the layers;
        identify a deposit area for transitional material within the one layer; and
        deposit the transitional material within the deposit area when switching colors.

2. The method of claim 1, wherein the deposit area comprises an infill area.

3. The method of claim 1, wherein the deposit area comprises a support structure.

4. The method of claim 1, wherein the deposit area comprises an area outside the full color three-dimensional object.

5. The method of claim 1, wherein the deposit area comprises a combination of an infill area, a support structure, and an area outside the full color three-dimensional object.

6. The method of claim 1, wherein generating instructions that direct the fabrication device to deposit the transitional material comprises:
    calculating a length of colored material used while switching colors;
    determining whether to generate transitional material based on the length of the colored material; and
    generating instructions directing the fabrication device to deposit the transitional material.

7. The method of claim 1, wherein transforming the three-dimensional model into instructions for the fabrication device comprises:
    slicing the three-dimensional model into layers with material information preserved; and
    determining the tool path for fabricating the full color three-dimensional object based on the addressable units for each layer, wherein determining the tool path comprises generating instructions that direct the fabrication device to:
        apply material for addressable units of a same material before switching materials;
        smooth an exterior of the full color three-dimensional object by switching materials at one of the addressable units within each layer; and
        deposit the transitional material within the identified deposit area when switching materials.

8. A computing system for fabricating full color three-dimensional objects, comprising:
    a fabrication device; and
    a fabrication manager communicably coupled to the fabrication device, wherein the fabrication manager comprises:
        a processor that is configured to execute stored instructions; and
        a system memory comprising code configured to:
        slice a three-dimensional model into layers with color information preserved;
        determine a tool path for fabricating a full color three-dimensional object from colored materials based on addressable units for each layer, wherein determining the tool path comprises generating instructions that direct the fabrication device to:
            apply colored material for addressable units of a same color before switching colors, the colored material to be adjusted to simulate a lighting effect based on lighting information indicating a luminosity value, the lighting effect to simulate at least one light shining on the full color three-dimensional object;
            smooth an exterior of the full color three-dimensional object by switching colors at an addressable unit within one of the layers;
            identify a deposit area for transitional material within the one layer; and
            deposit the transitional material within the deposit area when switching colors.

9. The computing system of claim 8, wherein the deposit area comprises an infill area.

10. The computing system of claim 8, wherein the deposit area comprises a support structure.

11. The computing system of claim 8, wherein the deposit area comprises an area outside the full color three-dimensional object.

12. The computing system of claim 8, wherein the deposit area comprises a combination of an infill area, a support structure, and an area outside the full color three-dimensional object.

13. The computing system of claim 8, wherein the system memory comprises code configured to generate instructions that direct the fabrication device to deposit the transitional material by:

calculating a length of colored material used while switching colors;

determining whether to generate transitional material based on the length of the colored material; and generating instructions directing the fabrication device to deposit the transitional material.

14. The computing system of claim 8, wherein transforming the three-dimensional model into instructions for the fabrication device comprises:

slicing the three-dimensional model into layers with material information preserved; and determining the tool path for fabricating the full color three-dimensional object based on the addressable units for each layer, wherein determining the tool path comprises generating instructions that direct the fabrication device to:

apply material for addressable units of a same material before switching materials;

smooth an exterior of the full color three-dimensional object by switching materials at one of the addressable units within each layer; and deposit the transitional material within the identified deposit area when switching materials.

15. The computing system of claim 8, wherein a surface of the full color three-dimensional object is fabricated in three dimensions.

16. The computing system of claim 8, wherein the layers comprise two-dimensional polygons.

17. One or more computer-readable storage media for storing computer-readable instructions, the computer-readable instructions providing a system for fabricating a three-dimensional object when executed by one or more processing devices, the computer-readable instructions comprising code configured to:

slice a three-dimensional model into layers with material information preserved; and determine a tool path for fabricating the three-dimensional object from different types of materials based on addressable units for each layer, wherein determining the tool path comprises generating instructions that direct a fabrication device to:

apply material for addressable units of a same material before switching materials, the material to be adjusted to simulate a lighting effect based on lighting information indicating a luminosity value, the lighting effect to simulate at least one light shining on a full color three-dimensional object;

smooth an exterior of the three-dimensional object by switching colors at an addressable unit within one of the layers;

identify a deposit area for transitional material within the one layer; and deposit the transitional material within the deposit area when switching colors.

18. The one or more computer-readable storage media of claim 17, wherein the different types of materials comprise color materials, transparent materials, dissolvable materials, or rubberlike materials, or any combinations thereof.

19. The one or more computer-readable storage media of claim 17, wherein the deposit area comprises an infill area.

20. The one or more computer-readable storage media of claim 17, wherein the deposit area comprises a support structure.

21. The one or more computer-readable storage media of claim 17, wherein the deposit area comprises an area outside the three-dimensional object.

* * * * *